(12) United States Patent
Watkins et al.

(10) Patent No.: US 8,117,350 B2
(45) Date of Patent: Feb. 14, 2012

(54) CONFIGURATION SPACE COMPACTION

(75) Inventors: John E. Watkins, Sunnyvale, CA (US); Elisa Rodrigues, Union City, CA (US)

(73) Assignee: Oracle America, Inc., Redwood Shores, CA (US)

( * ) Notice: Subject to any disclaimer, the term of this patent is extended or adjusted under 35 U.S.C. 154(b) by 277 days.

(21) Appl. No.: 12/611,694

(22) Filed: Nov. 3, 2009

(65) Prior Publication Data

US 2011/0106981 A1    May 5, 2011

(51) Int. Cl.
*G06F 3/00* (2006.01)
(52) U.S. Cl. .................................. 710/9; 710/3; 710/4
(58) Field of Classification Search .................. 710/3, 4, 710/8, 9
See application file for complete search history.

(56) References Cited

U.S. PATENT DOCUMENTS

| | | | | |
|---|---|---|---|---|
| 7,565,463 | B2 * | 7/2009 | Johnsen et al. | 710/30 |
| 7,574,536 | B2 * | 8/2009 | Johnsen et al. | 710/22 |
| 7,610,431 | B1 | 10/2009 | Watkins | |
| 7,979,592 | B1 * | 7/2011 | Pettey et al. | 710/3 |

* cited by examiner

*Primary Examiner* — Alford W. Kindred
*Assistant Examiner* — Ernest Unelus
(74) *Attorney, Agent, or Firm* — Park, Vaughan, Fleming & Dowler LLP; Anthony P. Jones

(57) ABSTRACT

The described embodiments provide a system for accessing values for configuration space registers (CSRs). This system includes a CSR data storage mechanism with an address input and a CSR data output. The CSR data storage mechanism includes a memory containing a number of memory locations for storing the true or actual values for CSRs for functions for corresponding devices. In these embodiments, the memory locations are divided into at least one shared region and at least one unique region. In these embodiments, in response to receiving an address for a memory location on the address input, the CSR data storage mechanism accesses the value for the CSR in the memory location in a corresponding shared region or unique region.

18 Claims, 18 Drawing Sheets

| | | | | Byte Offset (Hex) |
|---|---|---|---|---|
| 31 | | | 0 | |
| Device ID | | Vendor ID | | 00 |
| Status | | Command | | 04 |
| Class Code | | | Revision ID | 08 |
| BIST | Header Type | Master Latency Timer | Cache Line Size | 0C |
| Base Address Register 0 | | | | 10 |
| Base Address Register 1 | | | | 14 |
| Secondary Latency Timer | Subordinate Bus Number | Secondary Bus Timer | Primary Bus Timer | 18 |
| Secondary Status | | I/O Limit | I/O Base | 1C |
| Memory Limit | | Memory Base | | 20 |
| Prefetchable Memory Limit | | Prefetchable Memory Base | | 24 |
| Prefetchable Base Upper 32 Bits | | | | 28 |
| Prefetchable Base Lower 32 Bits | | | | 2C |
| I/O Limit Upper 16 Bits | | I/O Limit Lower 16 Bits | | 30 |
| Reserved | | | Capabilites Pointer | 34 |
| Expansion ROM Base Address | | | | 38 |
| Bridge Control | | Interrupt Pin | Interrupt Line | 3C |

Fig. 6

| Byte Offset (Hex) | | |
|---|---|---|
| Device ID | Vendor ID | 00 |
| Status | Command | 04 |
| Class Code | Revision ID | 08 |
| BIST / Header Type / Master Latency Timer | Cache Line Size | 0C |
| Base Address Registers | | 10 – 24 |
| Cardbus CIS Pointer | | 28 |
| Subsystem ID | Subsystem Vendor ID | 2C |
| Expansion ROM Base Address | | 30 |
| Reserved | Capabilities Pointer | 34 |
| Reserved | | 38 |
| Max_Lat / Min_Gnt / Interrupt Pin | Interrupt Line | 3C |

Fig. 7

| ADDRESS | DEFAULT WRITE DATA | WRITE MASK | LOOKUP STRUCTURE 2000 |
|---|---|---|---|
| 1 | WRITE DATA 1 | WRITE MASK 1 | |
| 2 | WRITE DATA 2 | WRITE MASK 2 | |
| ⋮ | ⋮ | ⋮ | |
| N-1 | WRITE DATA N-1 | WRITE MASK N-1 | |
| N | WRITE DATA N | WRITE MASK N | |

Fig. 20

CONFIGURATION SPACE COMPACTION

RELATED APPLICATIONS

This application is related to U.S. Pat. No. 7,610,431, filed on 14 Oct. 2005 by inventors John Watkins, Ola Torudbakken, John Petry, Michelle Wong, and Ravinandan Buchamwandla, entitled "Configuration Space Compaction".

BACKGROUND

The present invention relates to a communication apparatus and in particular, but not exclusively, to a PCI Express interconnect apparatus.

In many computer environments, a fast and flexible interconnect system is desirable to provide connectivity to devices capable of high levels of data throughput. In applications including of data transfer between devices in a computing environment, PCI Express (PCI-E) can be used to provide connectivity between a host and one or more client devices or endpoints. In fact, PCI Express is becoming a de-facto I/O interconnect for servers and desktop computers. During operation, PCI Express facilitates physical system decoupling (CPU<->I/O) through high-speed serial I/O.

The PCI Express Base Specification 1.0 sets out behavior requirements of devices using the PCI Express interconnect standard. According to this Specification, PCI Express provides a host to endpoint protocol where each endpoint connects to a host and is accessible by the host. PCI Express also imposes a stringent tree structured relationship between I/O Devices and a Root Complex.

The process of designing PCI devices can include significant amounts of engineering, and multi-function devices require additional effort to implement register sets associated with each added function. The hardware needs to provide a consistent model to the software but aspects of a design, such as the functions, devices, embedded bridges, etc., may not be determined early in the design and may change during development.

SUMMARY OF THE INVENTION

The present invention has been made, at least in part, in consideration of problems and drawbacks of conventional PCI express systems.

An aspect of the invention provides an interconnect apparatus for interconnecting at least one host to at least one device, and includes a plurality of presentation registers providing a presentation interface for the device to the host.

The interconnect apparatus comprises memory for holding the presentation registers and a governor operable to manage the presentation registers in the memory.

An example embodiment of the present invention involves partitioning device management into a presentation layer wherein the presentation layer defines and allows control of a device through its CSR registers and an underlying foundation layer which directly monitors and manipulates the PCI protocol. Firmware or management software can be employed to configure the components comprising the layers into an integral PCI device.

Some embodiments provide a system (e.g., presentation layer 300 in FIG. 14 and FIG. 16) for accessing values for configuration space registers (CSRs). This system includes a CSR data storage mechanism with an address input and a CSR data output. The CSR data storage mechanism includes a memory containing a number of memory locations for storing the true or actual values for CSRs for functions for corresponding devices. In these embodiments, the memory locations are divided into at least one shared region and at least one unique region. In these embodiments, in response to receiving an address for a memory location on the address input, the CSR data storage mechanism accesses the value for the CSR in the memory location in a corresponding shared region or unique region. If the access is a read, the CSR data storage mechanism can output the value for the CSR on the CSR data output.

In some embodiments, the system includes a CSR compaction mechanism with a CSR address input, a function type input, and an address output. In these embodiments, the CSR address input is coupled to a CSR address signal and the address output is coupled to the address input of the CSR data storage mechanism. In these embodiments, in response to receiving a CSR address on the CSR address input and a function type on the function type input, the CSR compaction mechanism outputs a lower portion of the address for the memory location in the address output.

In some embodiments, the CSR compaction mechanism includes a lookup structure. In these embodiments, the CSR compaction mechanism uses the CSR address and the function type to look up the lower portion of the address in the lookup structure.

In some embodiments, the CSR compaction mechanism includes a shared region output, and the system includes a region select multiplexer (MUX). In these embodiments, the region select MUX has an underlying function number input, a shared address region input, a select input, and an address output. In these embodiments, the select input is coupled to the shared region output of the CSR compaction mechanism, and the address output is coupled to the address input of the CSR data storage mechanism. In some embodiments, the CSR compaction mechanism asserts a signal on the shared region output when the CSR address and the function type indicate a CSR for which the value is stored in a shared region in the memory in the CSR data storage mechanism. In these embodiments, when the signal on the shared region output is asserted, the region select MUX passes a value on the shared address region input to the address output as an upper portion of the address for the memory location; otherwise, the region select MUX passes a value on the underlying function number input to the address output as the upper portion of the address for the memory location.

In some embodiments, the system includes a mapping mechanism with a host number input, a function number input, a function type output, and an underlying function number output. In these embodiments, the host number input is coupled to a host number signal, the function number input is coupled to a function number signal, function type output is coupled to the function type input of the CSR compaction mechanism, and the underlying function number output is coupled to the underlying function number input on the region select MUX. In these embodiments, in response to receiving a host number on the host number input and a function number on the function number input, the mapping mechanism outputs a function type (e.g., shared, physical, virtual) on the function type output and an underlying function number on the underlying function number output.

In some embodiments, the mapping mechanism includes a lookup structure. In these embodiments, the mapping mechanism uses the host number and the function number to look up the underlying function number in the lookup structure.

In some embodiments, the system includes a CSR write mask mechanism with an address input, a write mask output, and a write data output. In these embodiments, the address input is coupled to the address output of the CSR compaction mechanism. In these embodiments, in response to receiving an address for a CSR that includes one or more read-only bits, the CSR write mask mechanism outputs a write mask on the write mask output. In addition, in response to receiving an address for a CSR that includes one or more bits that use default write data, the CSR write mask mechanism outputs default write data on the write data output.

In some embodiments, the system includes a logic circuit with a write mask input, a host write data input, a default write data input, and filtered write data output. In these embodiments, the write mask input is coupled to the write mask output of the CSR write mask mechanism, the default write data input is coupled to write data output of the CSR write mask mechanism, and the host write data input is coupled to a host write data signal. In these embodiments, the logic circuit performs one or more bitwise operations to logically combine the write mask and the default write data with the host write data and output a resulting filtered write data on the filtered write data output.

In some embodiments, the CSR data storage mechanism further includes a write input, and the system further includes a write select MUX with a load data input, a filtered write data input, a select input, and a write data output. In these embodiments, the load data input is coupled to a load data signal, the filtered write data input is coupled to the filtered write data output of the logic circuit, and the select input is coupled to a load data control signal. In these embodiments, when the control signal on the load data control signal is asserted, the write select MUX passes the load data signal to the write data output to be written to the CSR data storage mechanism. Otherwise, the write select MUX passes the filtered write data signal to the write output to be written to the CSR data storage mechanism.

In some embodiments, the CSR compaction mechanism includes a shadow access output, and the system includes a shadow regs/ext logic controller ("control point circuit") with a shadow access input, an address input, and a control point output. In these embodiments, the shadow access input is coupled to the shadow access output of the CSR compaction mechanism and the address input is coupled to the address input of the CSR data storage mechanism. In these embodiments, in response to receiving a CSR access address and a function type that indicate that one or more of a shadow register or external logic is used to access the value for the CSR, the CSR compaction mechanism asserts a signal on the shadow access output to cause the control point circuit to access the shadow register or external logic.

In some embodiments, the CSR compaction mechanism, the CSR write mask mechanism, the mapping mechanism, and/or the control point circuit have a load data input and a load data control input. In these embodiments, each load data input is coupled to a load data signal, and each load data control input is coupled to the load data control signal. In response to receiving a predetermined load data control signal on the load data control input, the CSR data storage mechanism, the CSR compaction mechanism, the CSR write mask mechanism, the mapping mechanism, or the shadow regs/ext logic controller writes the load data to a corresponding memory location.

In some embodiments, each shared region includes at least one memory location where a value is stored for a corresponding CSR that is shared between two or more functions, and each unique region comprises at least one memory location where a value is stored for a corresponding CSR that is used for only one function.

Although various aspects of the invention are set out in the accompanying independent claims, other aspects of the invention include any combination of features from the described embodiments and/or the accompanying dependent claims with the features of the independent claims, and not solely the combinations explicitly set out in the accompanying claims.

BRIEF DESCRIPTION OF THE FIGURES

Specific embodiments of the present invention will now be described by way of example only with reference to the accompanying Figures in which:

FIG. 6 is a schematic structure overview for a Type 1 configuration header;

FIG. 7 is a schematic structure overview for a Type 0 configuration header;

FIG. 20 presents a block diagram of a lookup structure in a CSR write mask mechanism in accordance with the described embodiments.

Figure 1:
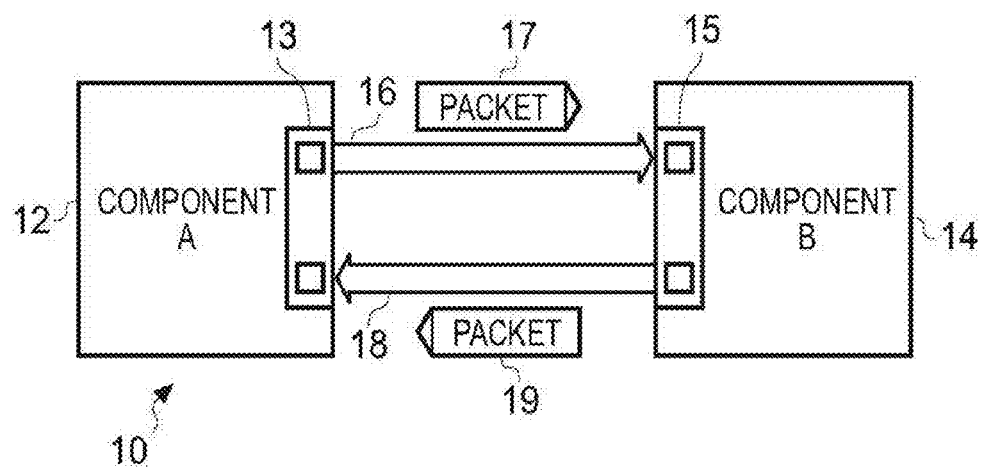
FIG. 1 is a schematic representation of a PCI Express connection.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DESCRIPTION OF PARTICULAR EMBODIMENTS

Embodiments of the invention are described in the following with reference to an example of an interconnect apparatus for supporting PCI Express. Note that in the following description we use variables to represent numerical values. Even where a similar variable is used across two or more examples, the value represented by the variable is not guaranteed to be the same value. In other words, the value for a variable of the same name between examples may be different.

The PCI Express 1.0 standard set out in the PCI Express Base Specification 1.0 available from the PCI (Peripheral Component Interconnect) Special Interest Group is one example of a computer interconnect standard. The PCI Express architecture is a high performance, general purpose I/O interconnect defined for a wide variety of existing and future computing and communication platforms. Key attributes from the original PCI architecture, such as its usage model, load-store architecture, and software interfaces, are maintained. On the other hand, the parallel bus implementation of PCI is replaced in PCI Express by a highly scalable, fully serial interface. Among the advanced features supported by PCI Express are Power Management, Quality of Service (QoS), Hot-Plug/Hot-Swap support, Data Integrity and Error Handling. PCI Express is also backwards compatible with the software models used to describe PCI, such that PCI Express hardware can be detected and configured using PCI system configuration software implementations with no modifications.

With reference to FIG. 1, there will now be described the basic point-to-point communications channel provided by PCI Express. A component collection consisting of two ports and the lanes connecting those ports can be referred to as a link. A link represents a dual-simplex communications channel between two components. As shown in FIG. 1, in its simplest form, a link 10 includes two components 12 and 14, each including a respective transmit and receive port pair 13 and 15. Two uni-directional, low-voltage, differentially driven channels 16 and 18 connect the ports of the components, one channel in each direction. The channel pair can be referred to as a lane. The channels 16 and 18 each carry packets 17 and 19 between the components. According to the PCI Express 1.0 specification, each lane provides a data transfer rate of 2.5 Gigabits/second/lane/direction. For circumstances where this data bandwidth is insufficient, to scale bandwidth, a link may aggregate multiple Lanes denoted by xN where N may be any of the supported Link widths. An x8 Link represents an aggregate bandwidth of 20 Gigabits/second of raw bandwidth in each direction. This base specification 1.0 describes operations for x1, x2, x4, x8, x12, x16, and x32 Lane widths. According to the specification only symmetrical links are permitted, such that a link includes the same number of lanes in each direction.

Figure 2:
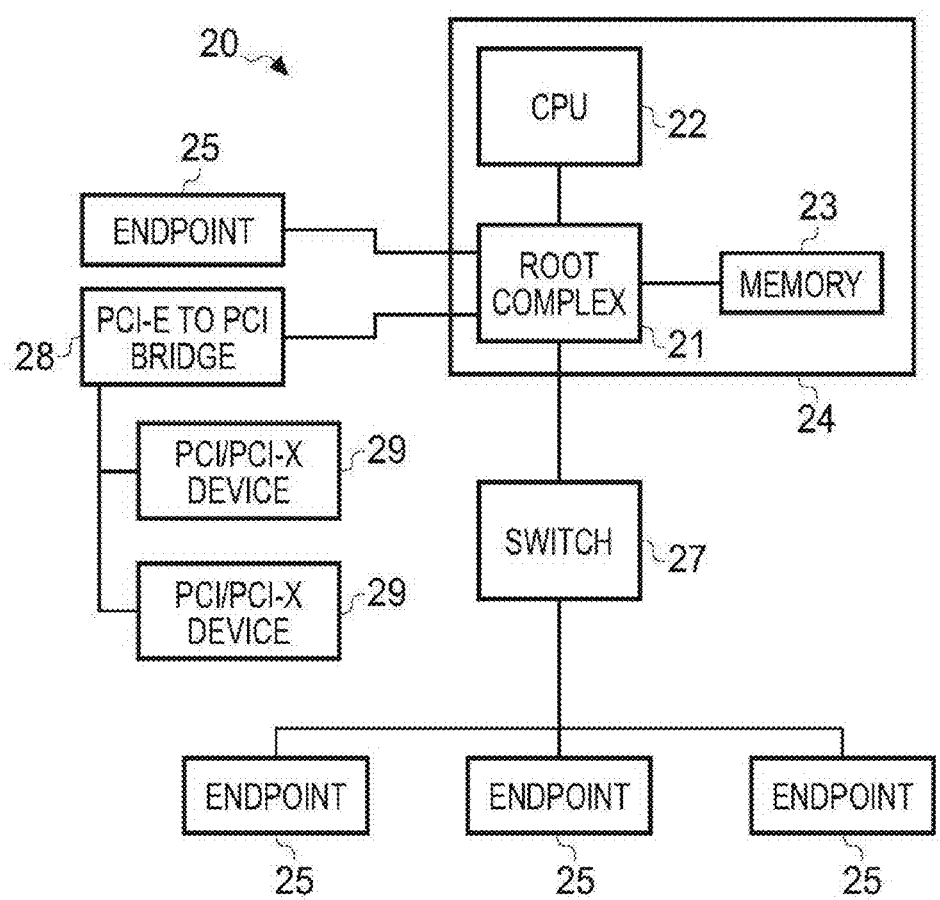
FIG. 2 is a schematic representation of an example of a PCI Express fabric topology.

With reference to FIG. 2, there will now be described an example of a PCI Express fabric topology 20. A fabric is composed of point-to-point links that interconnect a set of components. In the example of FIG. 2, there is shown a single fabric instance 20 referred to as a hierarchy, composed of a root complex 21, multiple endpoints 25 (such as I/O devices), a switch 27, and a PCI Express to PCI Bridge 28, all interconnected via PCI Express Links. The root complex 21 can be connected to a CPU 22 and memory 23 subsystem which requires access to the I/O facilitated by the PCI Express Fabric. The combination of root complex, CPU and memory can be referred to as a host 24. Each of the components of the topology is mapped in a single flat address space and can be accessed using PCI-like load/store transaction semantics.

A root complex 21 is the root of an I/O hierarchy that connects the CPU/memory subsystem to the I/O. As illustrated in FIG. 2, a root complex 21 may support one or more PCI Express Ports. Each interface defines a separate hierarchy domain. Each hierarchy domain may be composed of a single endpoint or a sub-hierarchy containing one or more switch components and endpoints. The capability to route peer-to-peer transactions between hierarchy domains through a root complex is optional and implementation dependent. For example, an implementation may incorporate a real or virtual switch internally within the root complex to enable full peer-to-peer support in a software transparent way.

An endpoint 25 is a type of device that can be the requester or completer of a PCI Express transaction either on its own behalf or on behalf of a distinct non-PCI Express device (other than a PCI device or Host CPU). Examples of endpoints include: a PCI Express attached graphics controller, a PCI Express-USB host controller, and a PCI Express attached network interface such as an Ethernet MAC/PHY or Infiniband Host Channel Adapter (HCA).

Figure 3:
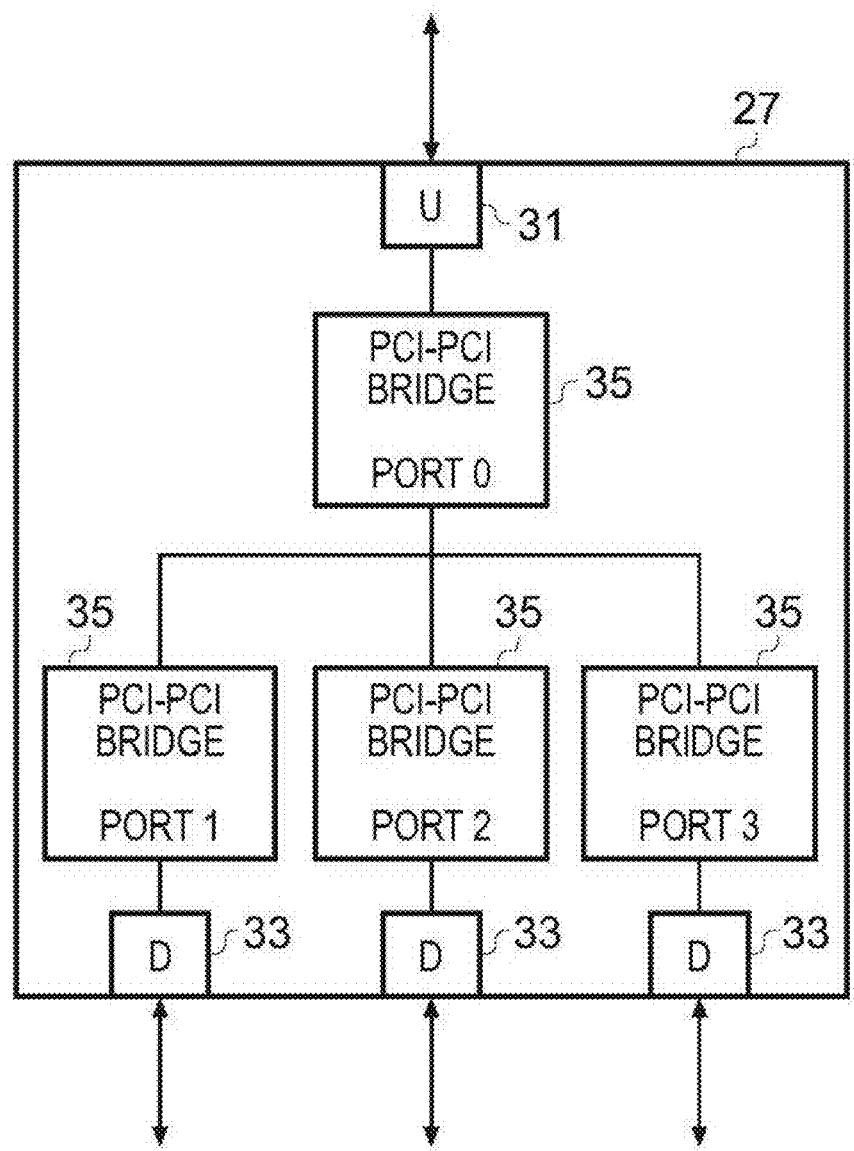
FIG. 3 is a schematic representation of a PCI Express switch.

A switch 27 is a logical assembly of multiple virtual PCI Express to PCI Express bridge devices as illustrated in FIG. 3. As shown in FIG. 3, an upstream port 31 which connects in the direction of a host connects to a number of downstream ports 33 via a switch fabric made up of a number of virtual PCI Express to PCI Express bridges. Switches are governed by a number of rules. Amongst these rules is a requirement that switches appear to configuration software as two or more logical virtual PCI Express to PCI Express Bridges and forward transactions using PCI Bridge mechanisms; e.g., address based routing. Also, a switch is not allowed to split a packet into smaller packets, e.g., a single packet with a 256-byte payload must not be divided into two packets of 128 bytes payload each. Each virtual PCI Express to PCI Express bridge 35 can be a physical PCI Express to PCI Express bridge or can be an alternative physical structure which is controlled to behave as a PCI Express to PCI Express bridge.

With reference to FIG. 2, it is noted that a PCI Express to PCI Bridge 28 can provide a connection between a PCI Express fabric and a PCI/PCI-X hierarchy. Thereby, conventional PCI/PCI-X devices 29 may be connected to the PCI Express fabric and accessed by a host including a PCI Express root complex.

A PCI Express fabric can be configured using one of two mechanisms. These are: a PCI compatible configuration mechanism which supports 100% binary compatibility with operating systems and host firmware and their corresponding bus enumeration and configuration software that is compatible with, for example, PCI rev 3.0 or later; and a PCI Express enhanced configuration mechanism which is provided to increase the size of available configuration space and to optimize access mechanisms.

Each PCI Express Link is mapped through a virtual PCI-to-PCI Bridge structure and has a logical PCI bus associated with it. The virtual PCI-to-PCI Bridge structure may be part of a PCI Express Root Complex Port, a Switch Upstream Port, or a Switch Downstream Port. A Root Port is a virtual PCI-to-PCI Bridge structure that originates a PCI Express hierarchy domain from a PCI Express Root Complex. Logical devices are mapped into configuration space such that each will respond to a particular device number. In the present case the device number is a Bus, Device, Function number (BDF).

A BDF can comprise a 16-bit field including a Bus Number (8-bit, BN), a Device Number (5-bit, DN) and a Function Number (3-bit, FN).

Figure 4:
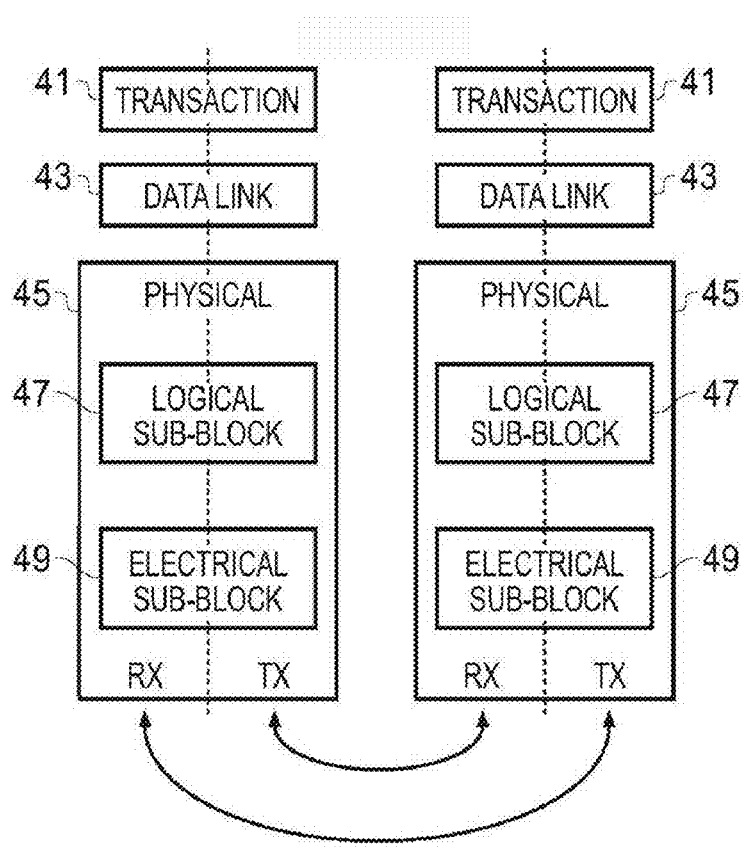
FIG. 4 is a schematic overview of layering within PCI Express.

A schematic overview of the PCI Express architecture in layers is shown in FIG. 4. As shown, there are three discrete logical layers: the Transaction Layer 41, the Data Link Layer 43, and the Physical Layer 45. Each of these layers is divided into two sections: one that processes outbound (to be transmitted) information and one that processes inbound (received) information.

PCI Express uses packets to communicate information between components. Packets are formed in the Transaction and Data Link Layers to carry the information from the transmitting component to the receiving component. As the transmitted packets flow through the other layers, they are extended with additional information necessary to handle packets at those layers. At the receiving side the reverse process occurs and packets get transformed from their Physical Layer representation to the Data Link Layer representation and finally (for Transaction Layer Packets) to the form that can be processed by the Transaction Layer of the receiving device.

Figure 5:
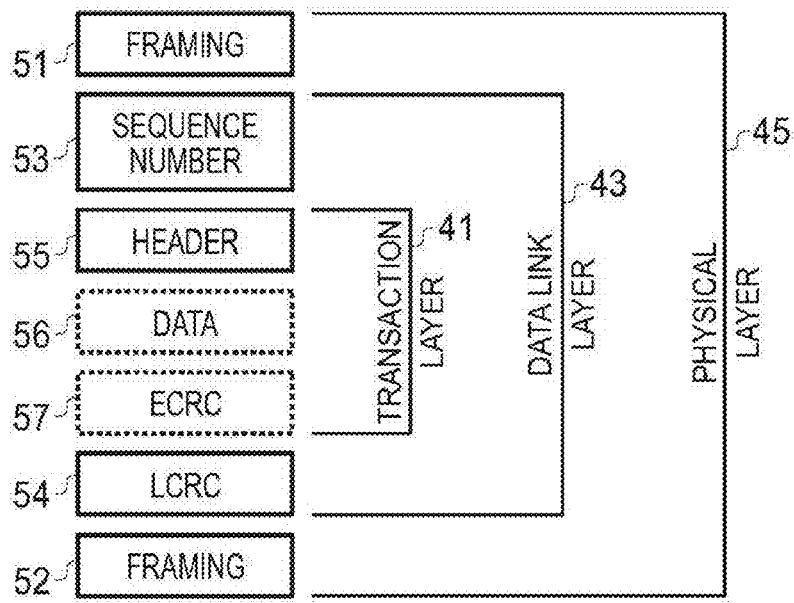
FIG. 5 is a schematic representation of packet flow showing data encapsulation through the PCI-E logic layers shown in FIG. 4.

A conceptual overview of the flow of transaction level packet information through the layers is shown in FIG. 5. Thus the Transaction Layer 41 provides a packet header 55, and can provide a data payload 56 and an optional end-to-end cyclic redundancy check (ECRC) 57. The data link layer applies a sequence number 53 and a LCRC (Link Cyclic Redundancy Check) 54. The Physical Layer 45 then provides Framing 51, 52 for the packet. A simpler form of packet communication is supported between two Data Link Layers (connected to the same Link) for the purpose of Link management.

The upper Layer of the architecture is the Transaction Layer 41. The Transaction Layer's primary responsibility is the assembly and disassembly of Transaction Layer Packets (TLPs). TLPs are used to communicate transactions, such as read and write, as well as certain types of events. The Transaction Layer is also responsible for managing credit-based flow control for TLPs.

Every request packet requiring a response packet is implemented as a split transaction. Each packet has a unique identifier that enables response packets to be directed to the correct originator. The packet format supports different forms of routing or addressing depending on the type of the transaction. In this example, memory and I/O requests are routed based upon address, completions and configuration requests are routed based upon BDFs, and messages are implicitly routed to the root complex. The Packets may also have attributes such as No Snoop and Relaxed Ordering.

The transaction Layer supports four address spaces: the three PCI address spaces (memory, I/O, and configuration) and a Message Space. According to the PCI Express specification, the Message Space is used for error handling and to support all prior sideband signals, such as interrupt emulation, power-management requests, and so on, as in-band Message transactions. PCI Express Message transactions can be considered as "virtual wires" since their effect is to eliminate the wide array of sideband signals used in a conventional platform implementation.

The middle Layer in the stack, the Data Link Layer 43, serves as an intermediate stage between the Transaction Layer 41 and the Physical Layer 45. The primary responsibilities of the Data Link Layer 43 include Link management and data integrity, including error detection and error correction.

The transmission side of the Data Link Layer 43 accepts TLPs assembled by the Transaction Layer 41, calculates and applies a data protection code and TLP sequence number, and submits them to Physical Layer 45 for transmission across the Link. The receiving Data Link Layer 43 is responsible for checking the integrity of received TLPs and for submitting them to the Transaction Layer 41 for further processing. On detection of TLP error(s), this Layer is responsible for requesting retransmission of TLPs until information is correctly received, or the Link is determined to have failed.

The Data Link Layer 43 also generates and consumes packets that are used for Link management functions. To differentiate these packets from those used by the Transaction Layer (TLP), the term Data Link Layer Packet (DLLP) is used when referring to packets that are generated and consumed at the Data Link Layer.

The Physical Layer 45 includes all circuitry (electrical sub-block 49) for interface operation, including driver and input buffers, parallel-to-serial and serial-to-parallel conversion, PLL(s) (Phase-locked-loops), and impedance matching circuitry. It includes also logical functions (logic sub-block 47) related to interface initialization and maintenance. The Physical Layer 45 exchanges information with the Data Link Layer 43 in an implementation-specific format. This Layer is responsible for converting information received from the Data Link Layer 43 into an appropriate serialized format and transmitting it across the PCI Express Link at a frequency and width compatible with the device connected to the other side of the Link.

The PCI Express architecture has various facilities to support future performance enhancements via speed upgrades and advanced encoding techniques. Depending on actual implementation of these enhancements, the future speeds, encoding techniques or media may only impact the Physical Layer definition.

The Transaction Layer 41, in the process of generating and receiving TLPs, exchanges Flow Control information with its complementary Transaction Layer 41 on the other side of the Link. It also supports both software and hardware-initiated power management.

Initialization and configuration functions require the Transaction Layer 41 to store Link configuration information generated by the processor or management device and store Link capabilities generated by Physical Layer hardware negotiation of width and operational frequency A Transaction Layer's Packet generation and processing services require it to: generate TLPs from device core Requests; convert received Request TLPs into Requests for the device core; convert received Completion Packets into a payload, or status information, deliverable to the core; detect unsupported TLPs and invoke appropriate mechanisms for handling them; and if end-to-end data integrity is supported, generate the end-to-end data integrity CRC and update the TLP header accordingly.

Within flow control, the Transaction Layer 41 tracks flow control credits for TLPs across the Link. Transaction credit status is periodically transmitted to the remote Transaction Layer using transport services of the Data Link Layer. Remote Flow Control information is used to throttle TLP transmission.

The transaction layer 41 can also implement ordering rules including the PCI/PCI-X compliant producer consumer ordering model and extensions to support relaxed ordering.

Power management services within the transaction layer 41 may include: ACPI/PCI power management, as dictated by system software; and hardware-controlled autonomous power management minimizes power during full-on power states.

The transaction layer 41 can also implement handling of Virtual Channels and Traffic Class. The combination of Virtual Channel mechanism and Traffic Class identification is provided to support differentiated services and QoS (Quality of Service) support for certain classes of applications. Virtual Channels provide a means to support multiple independent logical data flows over given common physical resources of the Link. Conceptually, this involves multiplexing different data flows onto a single physical Link. The Traffic Class is a Transaction Layer Packet label that is transmitted unmodified end-to-end through the fabric. At every service point (e.g., Switch) within the fabric, Traffic Class labels are used to apply appropriate servicing policies. Each Traffic Class label defines a unique ordering domain—no ordering guarantees are provided for packets that contain different Traffic Class labels.

The Data Link Layer 43 is responsible for reliably exchanging information with its counterpart on the opposite side of the Link. Accordingly, it has responsibility for initialization and power management services to: accept power state requests from the Transaction Layer 41 and convey them to the Physical Layer 45; and to convey active/reset/disconnected/power managed state information to the Transaction Layer 41.

The data link layer 43 also provides data protection, error checking and retry services, including: CRC generation; transmitted TLP storage for data link level retry; error checking; TLP acknowledgment and retry messages; and error indication for error reporting and logging.

The Physical Layer 45 provides services relating to interface initialization, maintenance control, and status tracking, including: Reset/Hot-Plug control/status; Interconnect power management; width and lane mapping negotiation; and polarity reversal. The physical layer 45 can also provide services relating to symbol and special ordered set generation including: 8-bit/10-bit encoding/decoding; and embedded clock tuning and alignment.

Within symbol transmission and alignment, the physical layer 45 can provide services including: transmission circuits; reception circuits; elastic buffer at receiving side; and multi-lane de-skew (for widths >x1) at receiving side. The physical layer 45 can also provide system DFT (Design For Test) support features.

The inter-layer interfaces support the passing of packets and management information. The transaction/data link interface provides: byte or multi-byte data to be sent across the link (including a local TLP-transfer handshake mechanism, and TLP boundary information); and requested power state for the link. The data link to transaction interface provides: byte or multi-byte data received from the PCI Express link; TLP framing information for the received byte; actual power state for the Link; and Link status information.

The data link to physical interface provides: byte or multi-byte wide data to be sent across the link (including a data transfer handshake mechanism, and TLP and DLLP boundary information for bytes); and requested power state for the Link. The physical to data link interface provides: byte or multi-byte wide data received from the PCI Express link; TLP and DLLP framing information for data; indication of errors detected by the physical layer; actual power state for the link; and connection status information.

Thus there has now been described an overview of the basic principles of the PCI Express interface architecture. Further information regarding the architecture can be obtained from the PCI Special Interest Group and from a variety of texts describing the architecture, such as "Introduction to PCI Express: A Hardware and Software Developer's Guide" ISBN: 0970284691, and "PCI Express System Architecture" ISBN: 0321156307.

As described above, a PCI Express switch provides a single upstream port and one or more downstream ports. Configuration of the ports can be carried out using the PCI Express configuration space headers. Examples of relevant headers are shown in FIG. 6. Each port typically behaves as a PCI Express to PCI Express bridge as specified by the PCI Express Base Specification and P2P Bridge Specification (and can therefore be considered to be a virtual PCI Express to PCI Express bridge (P2P)). Each P2P bridge is identified through a class code register in a Type 1 header being equal to a P2P (0x060400). Note that in accordance with the PCI Express specification, a PCI Express endpoint control and status register description is defined as a Type 0 and a P2P control and status register is defined as a Type 1. The class code is part of the control and status register in the Type 0/1 headers.

A conventional PCI Express switch is shown in FIG. 3 and described above. During system initialization, a bus-walk is performed by the system platform 24 (the owner of root complex 21). The bus-walk takes place as a series of configuration requests. Each device in a PCI Express hierarchy (including a switch port P2P device) is identified using a BDF. Each transaction layer packet which is transferred over the fabric includes a Requester ID field which is equal to the BDF of the requester of a transaction. In some cases, the packet may also include a Completer ID, which is the BDF of the completer of the transaction.

During the bus-walk, the system platform performs bus enumeration by conducting a series of configuration requests to the appropriate registers within the Type 0/1 headers of each device in the PCI Express hierarchy. This process assigns each device a unique BDF.

For example, in the switch shown in FIG. 3, the upstream port (PORT 0) may have a primary bus number of 1 (00000001), a secondary bus number of 2 (00000010) (being a bridge, the P2P has one bus number for each bus to which it is connected), a device number of 0 (00000) in accordance with the PCI Express specification, and a function number of 0 (000). The upstream port is identified as an upstream port through PCI Express Capabilities CSR Device Port Type field (the location of which is identified by the capability pointer field in the header) of the P2P control and status register within the upstream port Type 1 configuration header. Each downstream port (PORT 1, PORT 2, and PORT 3) has a primary bus number of 2 (00000010), and respective ports may have respective device numbers, e.g., PORT 1 may have device number 1 (00001), PORT 2 may have device number 2 (00010), and PORT 3 may have device number 3 (00011). In the case of the devices attached to the ports being single function devices, each will have a function number of 0 (000). If the attached devices were to be multi-function devices, the first function of any given device will be 0, with further functions being assigned function numbers in the range 1-7 as made possible by the three bits of the function number.

All P2P bridges are accessed through Type 1 configuration requests, and during enumeration, the host platform/root complex accesses registers within the bridge's Type 1 configuration space. An example of the PCI Express Type 1 configuration space header is shown in FIG. 6. As can be seen from the Figure, the Type 1 header includes fields identifying the device (Device ID, which is a physical device identifier, and Vendor ID, which is an identifier of the vendor company of the device). The Type 1 header also includes fields describing the status of the device (Status and Command, which is the Command and Status Register which provides status and control over the PCI Express interface). The Class Code field is used to define the type of device, as indicated above the P2P bridge is identified by a class code of 0x060400. The Type 1 header also has fields to identify the primary and secondary bus numbers of the P2P, and fields for BARs, and Base/Limit fields. The remaining fields are not of direct relevance to the present discussion, so in the interests of not obscuring the present disclosure, the reader's attention is directed to the PCI Express base specification for full details of these fields. The downstream ports are accessed using Type 1 configuration requests with a BDF of {BN=virtual PCI Bus (2 in FIG. 3), DN=actual port/device, FN=function number within device implementing port}.

Also, respective ports may have respective secondary bus numbers, e.g., PORT 1 may have secondary bus number 3 (00000011), PORT 2 may have secondary bus number 4 (00000100), and PORT 3 may have secondary bus number 5 (00000101). Any of the devices may have a subordinate bus number (also identified in the Type 1 header) depending on the way in which the device is connected to the port. In the present example, it is assumed that device 3 connects to PORT 3 via a further P2P device. That further P2P has a primary bus number of 5 and a secondary bus number of 6, thus the subordinate bus number of PORT 3 in the present example is 6 (00000110). The subordinate bus number is the last bus number in the downstream hierarchy of a given port. The upstream port forwards Type 1 configuration requests to downstream ports when the configuration requests target a downstream port's subordinate bus. In case of an endpoint device being directly connected to a downstream port, the downstream P2P converts the Type 1 configuration request into a Type 0 configuration request. An example of the Type 0 configuration space header is shown in FIG. 7. As can be seen from that Figure, many of the fields are common to both Type 0 and Type 1 headers.

Of the fields in the Type 0 header which are not used in the Type 1 header, the Min_Gnt and Max_Lat headers are not used in PCI Express and are set to 0 value and read only status for PCI Express configuration. The remaining fields are not of direct relevance to the present discussion, so in the interests of not obscuring the present disclosure, the reader's attention is directed to the PCI Express base specification for full details of these fields.

During configuration, memory space requested by devices is discovered and allocated by the platform. After configuration, the memory base/limit registers (BLRs) of a given port reflects the cumulative BARs for all downstream devices (i.e. downstream devices are mapped in contiguous address regions). For example, the BLR of PORT 1 may have a base of x0200 and a limit of x02FF, the BLR of PORT 2 may have a base of x0300 and a limit of x03FF, and the BLR of PORT 3 may have a base of x0400 and a limit of x04FF. Thus the BLR of PORT 0 must have a base of x0200 or lower and a limit of x04FF or higher. As each PORT has its own BLR space defined in the Type 1 header, PORT 0 must also have a BLR space for itself, thus in the present example, PORT 0 has a BLR with a base of x0200 and a limit of x04FF. There are independent BLRs for each of the three PCI address spaces. The I/O BLR has a 16 or 32-bit address, the memory BLR has a 32-bit address, and the prefetch memory BLR has a 32 or 64-bit address. According to the PCI Express specification, all PCI Express endpoints with the prefetchable bit set must support 64-bit addressing. To simplify address decoding, the I/O BLR supports 4 k page granularity, and the memory BLRs use 1 MB granularity. Fields are provided in the Type 1 header to identify the address ranges in the prefetchable, I/O and memory categories.

Memory requests & I/O requests are routed based upon address. In the downstream direction a request is forwarded (or processed) if the address falls within the port's BLR. Upstream forwarding is based upon inverse decode relative to the same BLRs. Within a switch each P2P (port) provides separate BLR registers for each of the three address spaces. In order for a port to make a forwarding decision, it must have explicit knowledge of the other ports' BLR ranges.

Thus the initialization and configuration of a PCI Express switch have been described.

Figure 8:
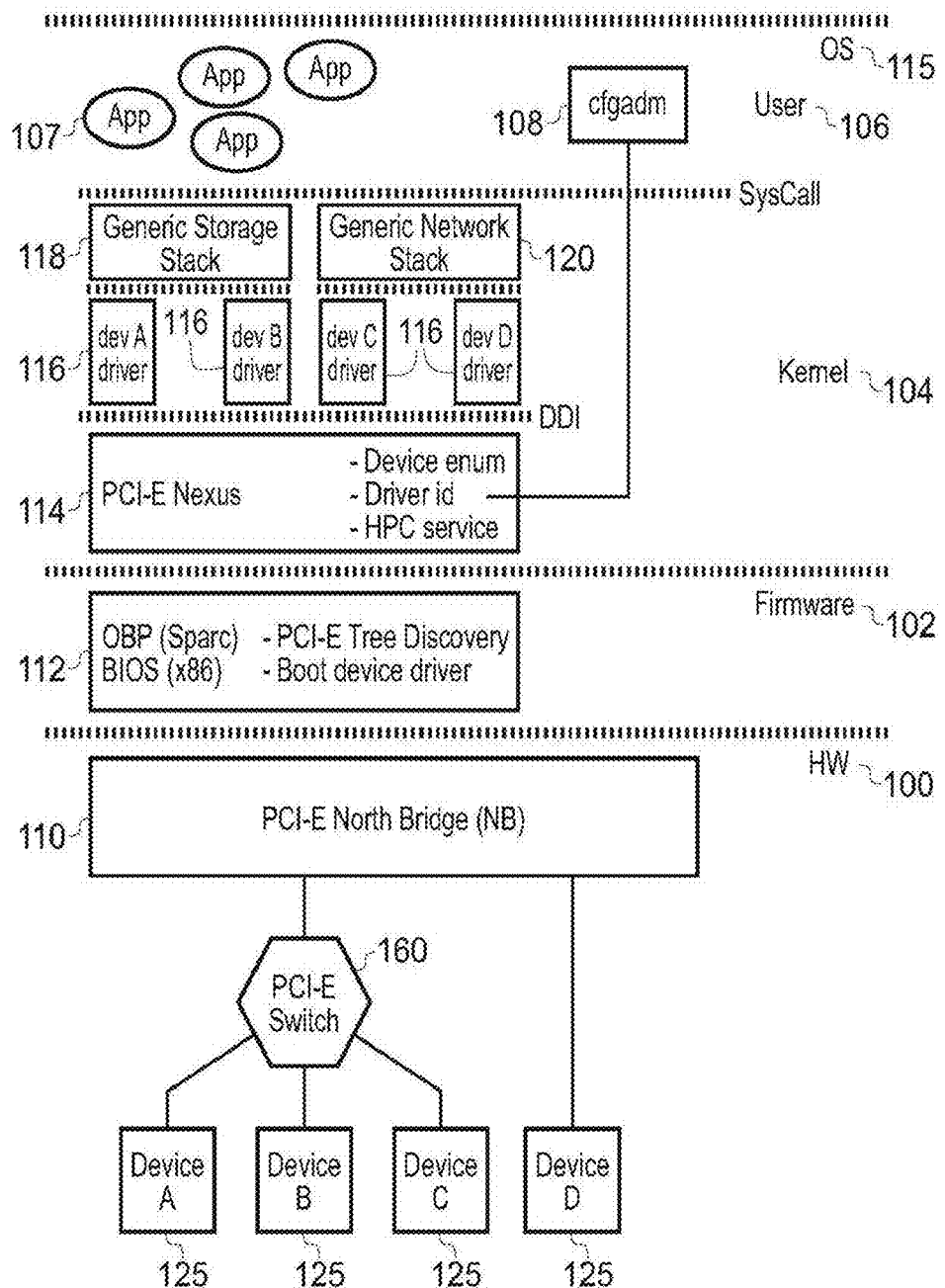
FIG. 8 is a schematic overview of an I/O software framework.

FIG. 8 provides a schematic overview of an example of an I/O software framework, in the present example a Solaris I/O software framework on a host. The software framework provides access to one or more I/O devices 125 via hardware 100 including a Northbridge 110 and a PCI-E switch 160. The platform (e.g., SPARC or x86) provides firmware 102 (e.g., OBP or BIOS 112) used before the operating system (OS) is booted. This firmware 102 and the OS software 115 combine to provide discovery and configuration (bus enumeration) of a PCI device tree. The Solaris OS run-time environment includes a kernel space 104 and a user space 106. A PCI-E Nexus driver (there are similar drivers in other operating systems) 114 in the kernel space 104 provides device enumeration, driver identification, drivers for the hostbridge and switches, and HPC (Hot-Plug Control) service. Each device 125 is handled either by a generic class driver or by a device specific driver 116 that interfaces to the (Solaris) environment via a Nexus device driver interface (DDI/DKI—Device Driver interface/Device Kernel Interface). Network device drivers interface to a generic OS network stack 120. Similarly, a generic storage stack 118 is provided for storage devices. In the user space 106, in which the applications 107 reside, device specific configuration commands and other generic commands for driver and device configuration could be issued through specific CLI (Command Line Interface) applications like cfgadm( ) and ifconfig( ) 108. It will be appreciated that other software frameworks are possible, for example a framework based on another operating system such as a Microsoft Windows OS, a Linux OS, etc.

A PCI device can have up to 8 functions. Each function may contain a number of registers which are defined within the PCI specification, although each function is not required to have an identical set of registers. Registers within a function capture status that changes many times faster than the rate at which a root complex can acquire information by individually sampling the many pieces of interface data a conformant device must collect. Device operation also requires manipulating signals per interface protocol that switch many times faster than the rate a remote host can manipulate. A device can incorporate sufficient foundation hardware for monitoring and controlling interface signals by collecting a sufficiently large subset into groups the remote host can manage.

An embodiment of this invention can be operable to divide this aspect of device behavior at a node in a bus hierarchy into two layers. A lower layer can contain foundation hardware necessary to collect and manipulate signals for a single or multi-function device. If the device is multi-function with N functions, this bottom layer may be split into N sub-units and individually configured into the device. The upper layer is the presentation view provided to the remote host.

Writing or reading registers within the presentation view is akin to accessing registers within a conventional PCI configuration space. However, in an embodiment of the invention, a remote host may in some cases read a shadow copy of a particular register rather than the register itself. As will be apparent later, this can provide advantages as regards flexibility, scalability, and efficiency.

Figure 9:
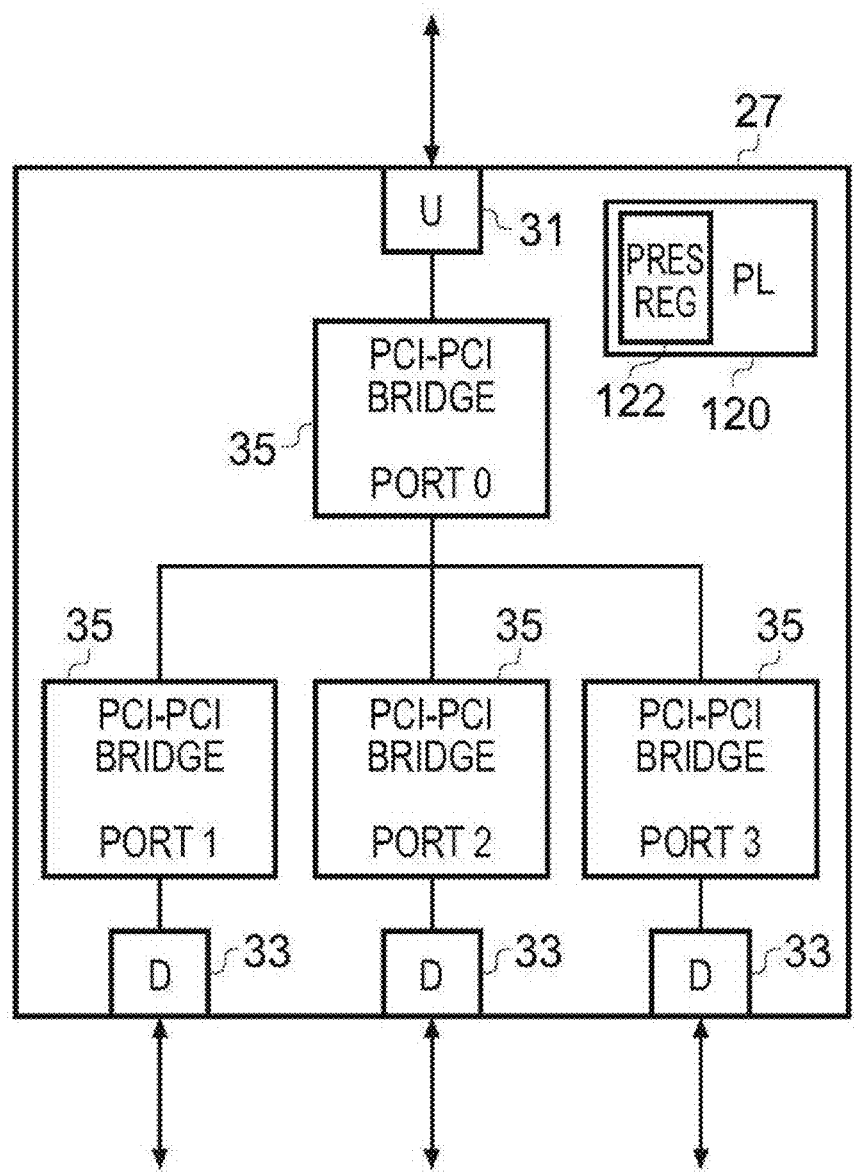
FIG. 9 corresponds generally to FIG. 3.

FIG. 9 corresponds generally to FIG. 3. To avoid repetition, the features already described with reference to FIG. 3 are referenced by like reference numerals and will not be further described here.

FIG. 9 additionally illustrates a Presentation Layer (PL) 120 that holds presentation registers 122. The presentation registers 122 of the presentation layer 120 provide a presentation interface for the device to the host. They provide a standardized mechanism for software (e.g., that of the software framework described with reference to FIG. 8) to be able to control controllable functions of one or more devices and to access status in respect of those functions. In the context of a PCI or PCI-E bus system for example, the presentation layer can be termed the Configuration Space and the presentation registers can be termed Configuration Space registers, or CSRs.

In a conventional interconnect apparatus, such registers are hardwired registers. Given that multiple presentation registers are required to support a device and the functions thereof, that an interconnect apparatus can be operable to support many devices, and that such a device can in turn support other devices thereby providing a hierarchy of devices, a large number of registers can be required. Not only does the number of registers take up a lot of real estate on an integrated circuit, the interconnects the registers require when implemented as flip-flops take up a considerable area of an interconnection device and indeed can limit the available number of devices that can be supported.

In an embodiment of the invention, at least some presentation registers are held in memory under the control of a governor for managing access to the presentation registers in the memory. This can enable a flexible, adjustable, and efficient presentation memory architecture. Embodiments of the invention can also support a multi-level bus hierarchy and device virtualization with support for multiple hosts. In one embodiment of the invention, the memory used is SRAM memory.

Figure 10:
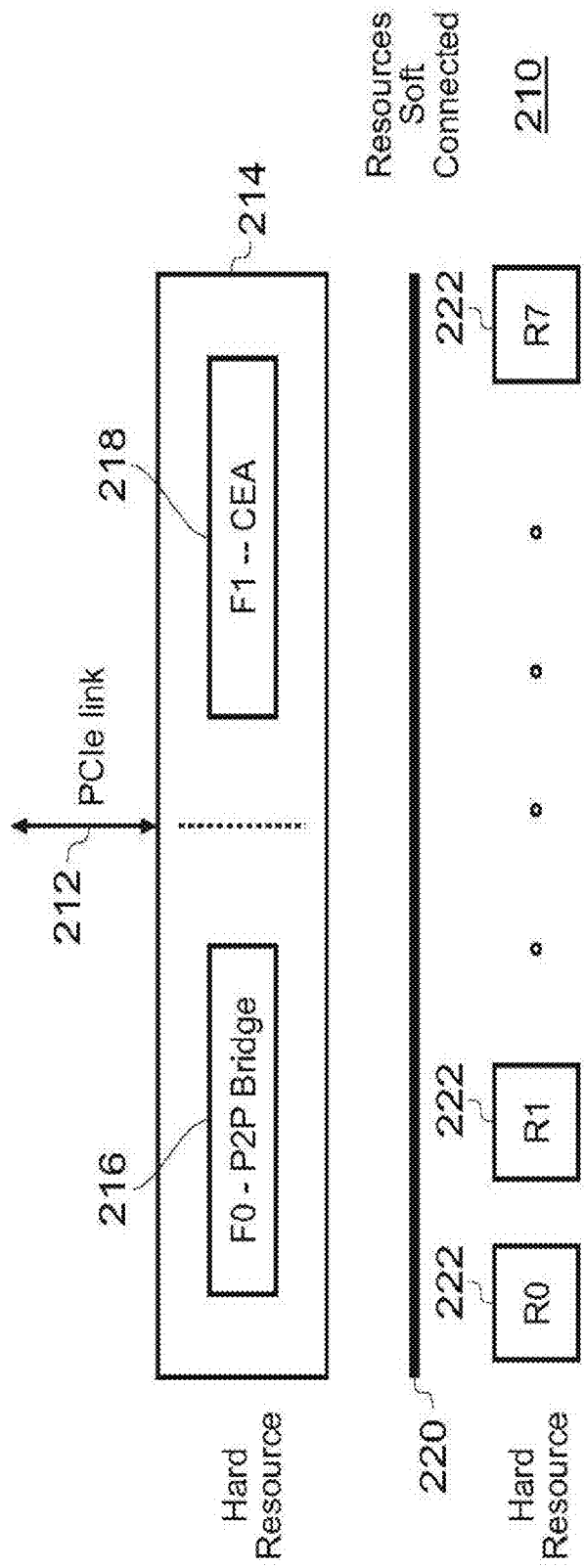
FIG. 10 is a schematic representation giving a resources view of a PCI device structure.
Figure 11:
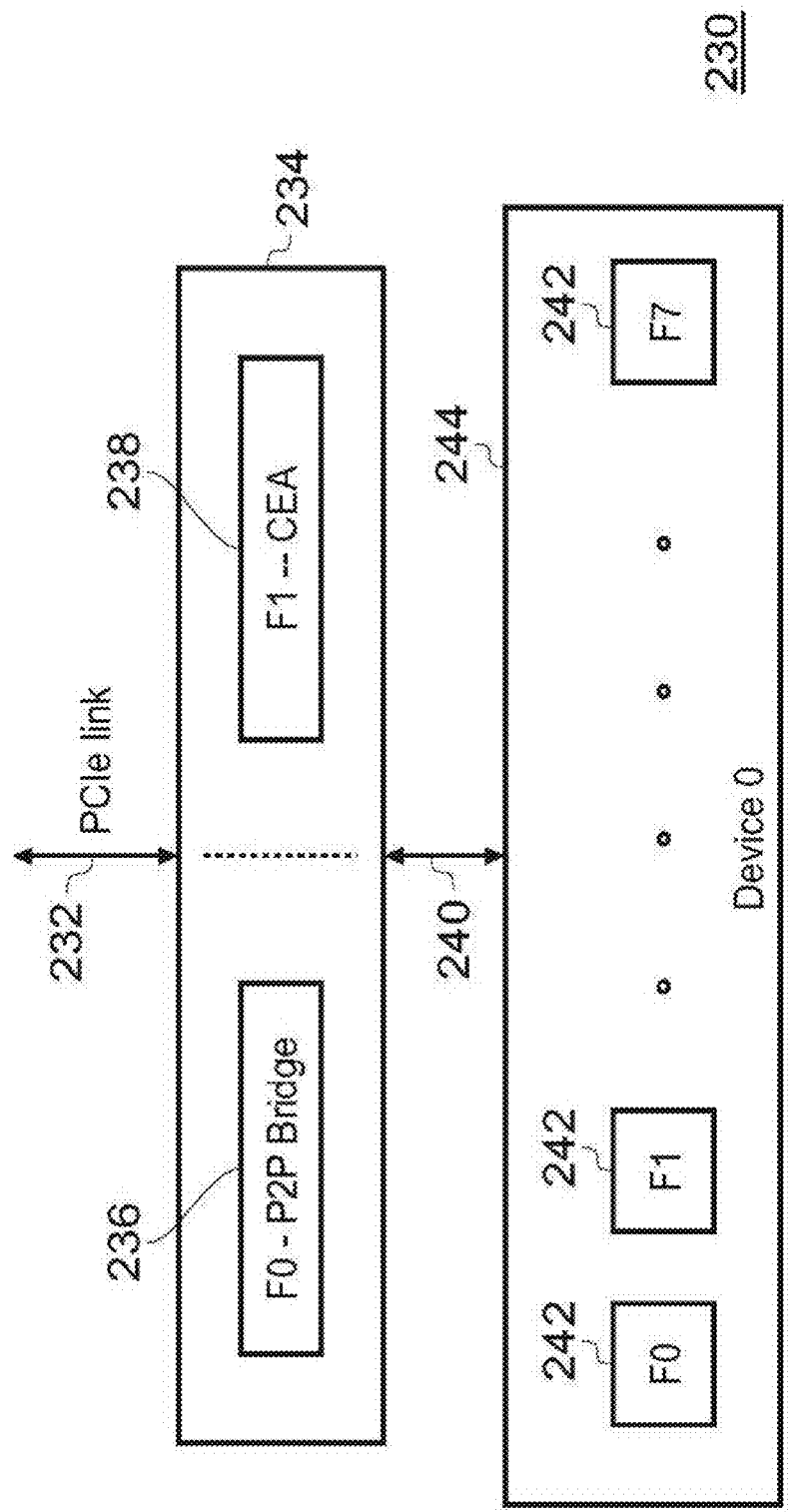
FIG. 11 is a schematic representation of a PCI device structure where the resources are functions.
Figure 12:
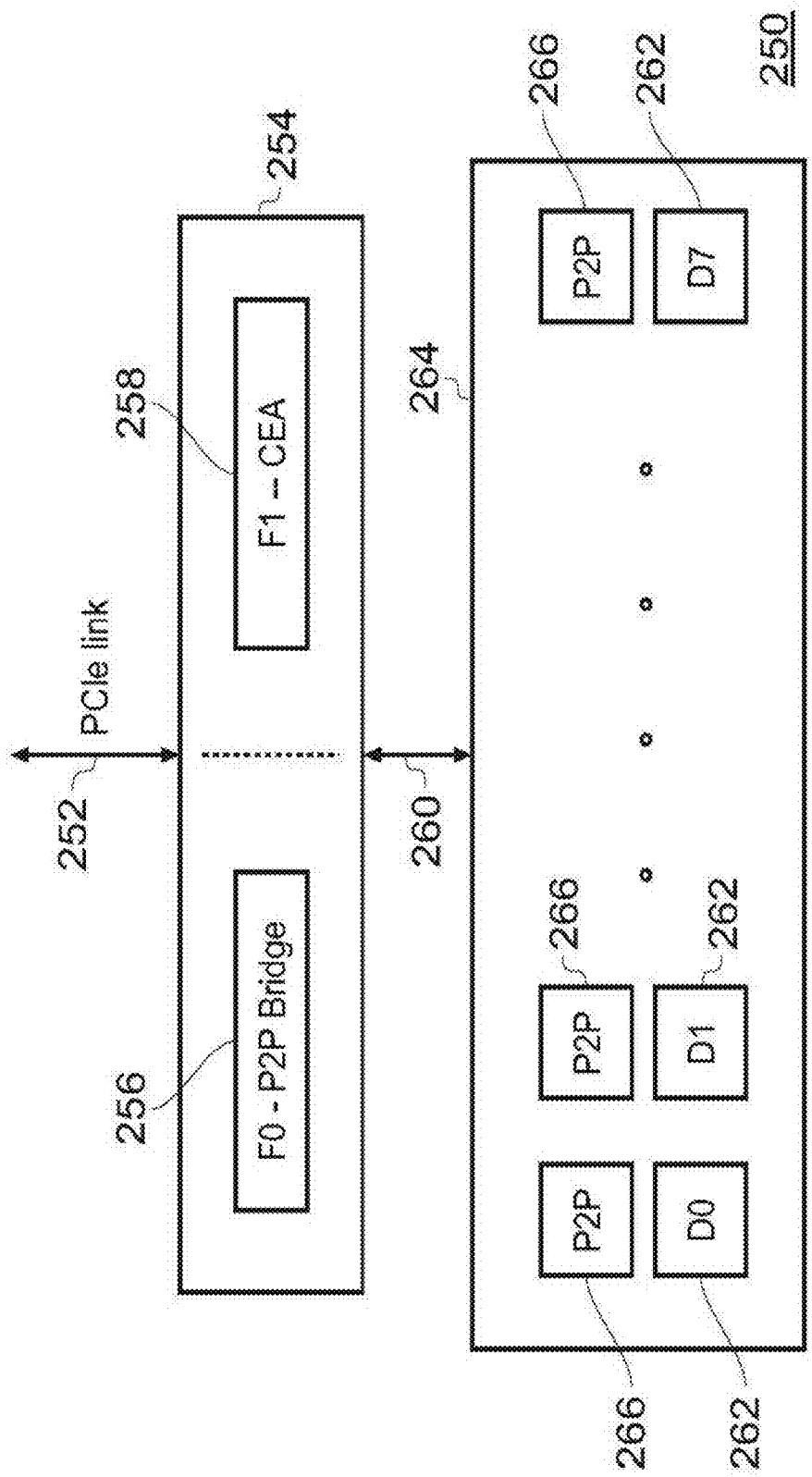
FIG. 12 is a schematic representation of a PCI device structure where the resources are devices.

FIGS. 10 to 13 illustrate examples of PCI structures. In these structures, a first function F0 is allocated to a first entity and other functions (F1, F2, etc) can be allocated to other entities. In the examples of FIGS. 10 to 12, the function F0 is allocated to a P2P bridge. However, it should be appreciated that the function F0 could be allocated to another entity instead.

FIG. 10 is a schematic representation of part of an example of a conventional PCI structure 210 in which a plurality of hard resources are supported via a software link 220. PCI requests are received at an interconnect apparatus 214 via a PCI Express link 212. In this example, the support in the interconnect apparatus 214 (e.g., a switch) for the hard resources R0-R7 includes a first function F0 216 that is allocated, for example, to a P2P bridge and optionally a second function F1 218 that is allocated, for example, to a configuration entity agent (CEA), the section of the device the configuration entity (CE) (e.g., 490 in FIG. 15) manipulates to determine how device resources should be shared. In a PCI structure, up to 32 devices, each having up to 8 functions can be supported for a P2P bridge and each device contains a function 0 to enable configuration by a host.

FIG. 11 is a schematic representation of part of another example of a conventional PCI structure 230 in which between 1 and 8 functions (F0-F7) 242 of a device 244 are supported via a link 240. PCI requests are received at an interconnect apparatus 234 via a PCI Express link 232. In this example, the support in the interconnect apparatus 234 (e.g., a switch) for the resource functions F0-F7 includes a first function F0 236 that is allocated, for example, to a P2P bridge and optionally a second function F1 238 that is allocated, for example, to a configuration entity agent. In other words, the 8 separate resources represented in FIG. 10 are implemented in this example as 8 functions of a single device.

FIG. 12 is a schematic representation of part of another example of a conventional PCI structure 250 where it is intended to support many devices. In this example, a first level compound device 264 includes up to 32 P2P bridges 266, to each of which is connected one or more second level devices 262. It should be understood that each of the second level devices could be a single device, for example with up to eight functions, or up to 32 devices, or a further compound device such as the first level compound device 264 that includes up to 32 P2P bridges and third level devices connected thereto, or a combination thereof. This structure can be extended as required to generate a hierarchical tree of devices supported via a link 260. As is the case for the examples of FIGS. 10 and 11, in FIG. 12 PCI requests are received at an interconnect apparatus 254 via a PCI Express link 252 and the support in the interconnect apparatus 254 (e.g., a switch) for the resources includes a first function F0 236 that is allocated, for example, to a P2P bridge and optionally a second function F1 238 that is allocated, for example, to a configuration entity.

Figure 13:
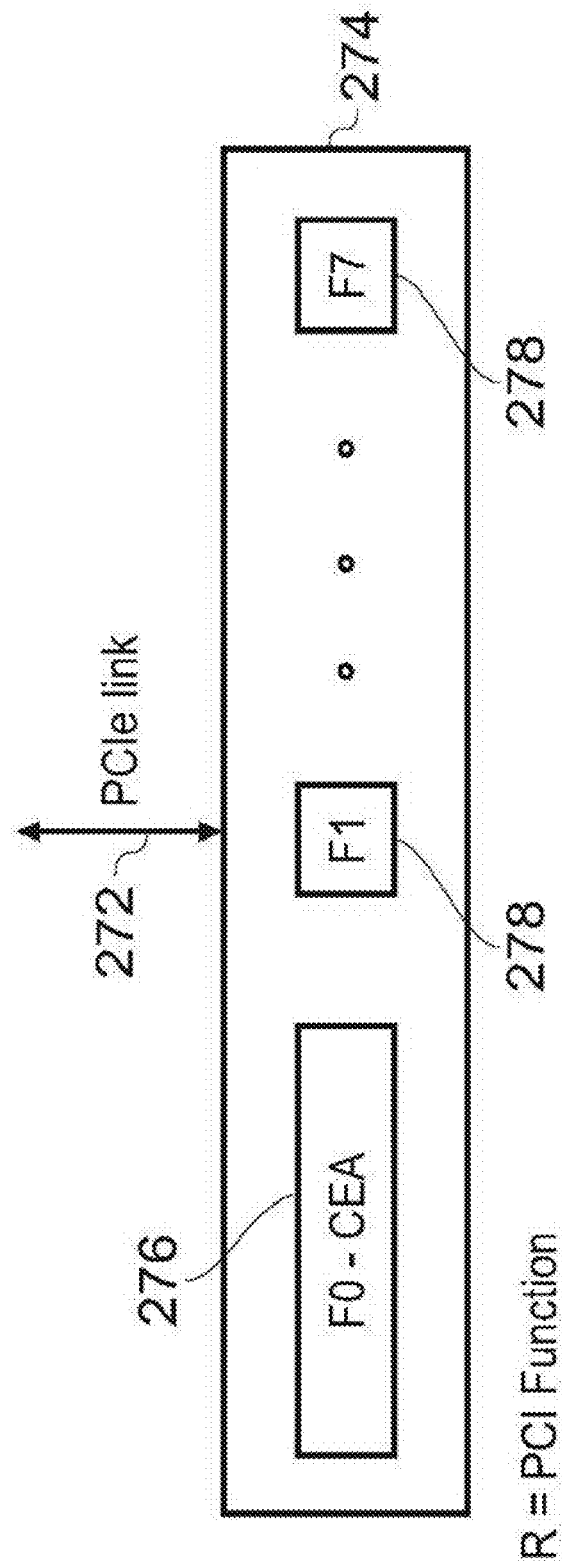
FIG. 13 is a schematic representation of a further PCI device structure where the resources are functions.

FIG. 13 is a schematic representation of part of an example of a conventional PCI structure 274 that has 8 (or less) functions 276 and 278, with one function dedicated for the configuration entity agent. As an example FIG. 13 shows Function 0 as the CEA 276 although any of the functions could be designated the CEA. This structure does not use a P2P bridge as in this example the functions are within one device on one bus. In FIG. 13 PCI requests are received at an interconnect apparatus 274 via a PCI Express link 272.

As indicated above, a constraint on the implementation of such a functional hierarchy is the ability, or otherwise, to provide presentation registers in the interconnect apparatus to support such a hierarchy.

As mentioned above, a node in a bus hierarchy can be split into two layers. The lower or foundation layer contains a set of resources used to monitor and control signaling on a bus or link interface which is beyond the speed a remote host can manage. The upper or presentation layer is what is seen and manipulated by the remote host. It is this upper or presentation layer that includes the presentation registers. As also mentioned above, in a PCI implementation it is this presentation layer that is typically termed the configuration space and it is the presentation registers of the space that are typically termed Configuration Space Registers (CSRs).

As the particularly described embodiments, which relate to a PCI implementation, reference will be made to CSRs as an example only of such presentation registers. In other implementations, the presentation registers could have a different name but still provide a standardized mechanism for software to be able to control controllable functions of one or more devices and/or to access status in respect of those functions.

A configuration entity, which can be implemented in a host or in an interconnect apparatus, can be responsible for configuring the components of the foundation layer and the presentation layer to form a node.

Figure 14:
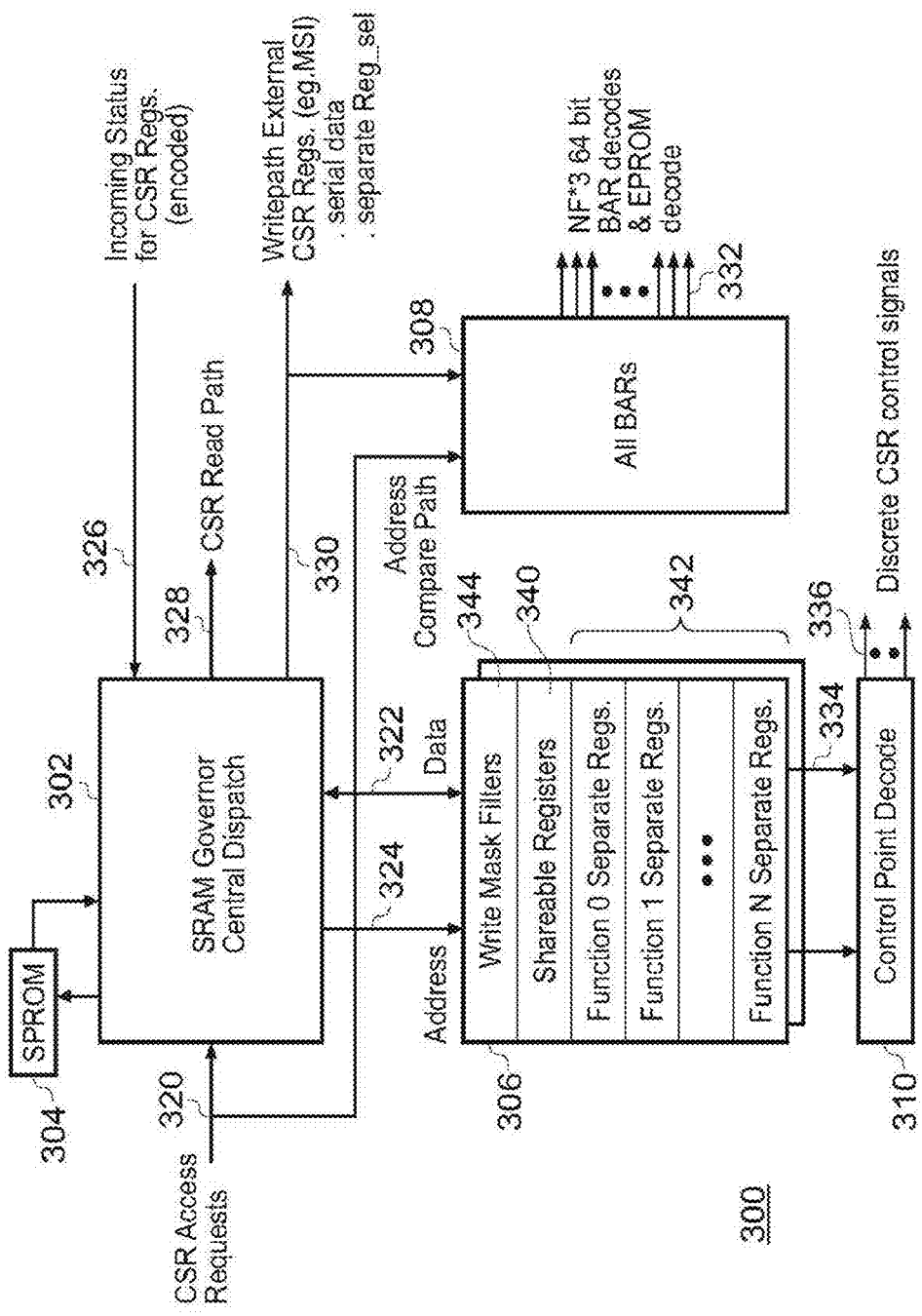
FIG. 14 is a schematic block diagram of part of an interconnect apparatus that includes a presentation layer.

FIG. 14 is a schematic representation of an example of such a presentation layer 300.

In the example illustrated, the true or actual values for CSRs are held in a memory 306, in the present example implemented as static random access memory (SRAM). In other examples other types of memory (e.g., dynamic random access memory (DRAM)) could be used. SRAM is faster and more reliable than DRAM but is also much more expensive than DRAM.

For at least some CSRs, the only version of the registers may be in the memory 306. The data for at least some of the those registers can be held in non-volatile memory, for example in serial configuration programmable read only memory (SPROM) 304 and then be copied to the memory 306 to set up the registers on initial configuration of the system. This is done prior to any potential access by a remote host. There may also be device specific registers that may be held separate from the memory 306 (e.g., as hard-wired registers). A hard-wired register can be in the form of a register with a fixed functionality, for example configured as a discrete, flip-flop-based register allocated to a single fixed address, as opposed, for example, to a soft configurable register.

Some registers within the presentation layer contain information that reflects dynamic conditions of the link which get captured to inform a remote host. Although this high speed status information must be captured, real time updates of the presentation layer are not required. Judiciously constraining when the layer updates occur limits the I/O bandwidth requirements for the presentation layer device reducing its cost (e.g., alleviates need for a multiple port SRAM).

Resource blocks within the foundation layer generate status updates. In many bus interface designs such as PCI Express, status is placed in specific word entries rather than scattered throughout many bit field entries of the entire configuration register space. Therefore, status updates to an SRAM based presentation layer can be done efficiently by writing the appropriate word entry within the SRAM.

A resource block formulates a status update word, saves it in a register, and informs the governor (e.g., by raising a flag) it has an update for the presentation layer. Should status from the resource block change again prior to the governor allowing the presentation layer update to occur, the resource block updates the information in the holding register. The governor polls presentation layer access requests from one or more remote hosts seeking read or write access and foundation layer resource blocks seeking status updates. Ensuring proper ordering of writes between remote host and resource block status updates into the presentation layer and returning non-stale data to the remote host during host reads is a design specific implementation issue.

Access rules can be provided, for example as follows:
a) Presentation layer access requests are placed into a request queue ordering the requests.
b) If multiple resource blocks exist and simultaneous requests from multiple blocks occur, round robin arbitration is used to determine the order which a block places its request in the queue.
c) When a remote host requests access, the governor ensures all previously enqueued resource block status updates are serviced before the remote host access. Should the remote host and one or more resource block requests occur simultaneously, the remote host has lowest priority and its request serviced last.

A governor 302 controls the operation of the registers configured in the memory 306, including, for example the setting up of the registers in the memory 306 on initiation and the maintenance and control of access to the registers thereafter. The governor can have one or more of the functions described below.

The governor 302 can be responsive to CSR access requests received at 320 from a host to control access to the appropriate registers in the memory 306. The governor can be configured not only to enable access to the registers, but to control the sort of access (read, write, etc.) and also to prevent an illegal access request (for example from a host without appropriate permissions) from gaining access to the registers concerned.

The governor 302 can also be responsive to incoming status information for the CSRs received at 326, for example from the devices themselves, to control access to the appropriate registers in the memory 306. The governor can be configured not only to enable access to the registers, but to control the sort of access (read, write, etc.) to a register and also to prevent an illegal access to a register (for example a write to a read-only field of a register by a remote host).

The governor 302 can be operable to output CSR information read from the CSRs via a CSR read path 328. The governor can also transmit writes to external CSR registers via an external CSR write path 330. The writes can be transmitted in any appropriate manner, including serially where there is a need to save on interconnections. A copy of vendor specific registers spaced within the CSR space that is shared by all foundation layer resources can be placed externally to the memory 306, for example if this is more efficient for a given implementation. The Base Address registers (BARs) shown in FIG. 14 are shadow write-only copies of the BARs held in the memory 306. These shadow copies of the BARs can be updated serially via the external CSR write path 330.

The governor 302 is also operable to control the output of discrete CSR control signals based on the content of CSR registers held in the memory 306. For those CSR registers that hold information in respect of discrete CSR control signals for controlling the supported devices, the governor 302 controls the output of the content of those CSRs in the memory 306 to a control point decoder 310. The control point decoder can be operable to decode the supplied CSR content and to output discrete CSR control signals 336 to the supported devices as appropriate. Alternatively, the CPD can snoop the address and data lines 324 and 322 to provide control point outputs.

As the presentation layer is efficiently implemented in memory, in the present instance in SRAM, setting or clearing signals within the presentation layer must manipulate logic (control points) within the foundation layer. An example from PCI Express is the Command Register which has control bits such as the "memory space enable" (bit 1) or "enable bus mastering" (bit 2) which when set or cleared cause interface logic to take specific action. Bit 1, for instance, when set causes the device to respond to an access by an external host if the address is within the range that has previously been programmed into a BAR. Bit 2, when set, allows a controlled device to initiate transactions (DMA activity). The control point decoder 310 is responsible for causing logic (i.e., flip-flops) in the foundation layer to be set to the correct value when the corresponding bit in the presentation layer is changed.

The control points can be activated in a number of ways, including the following examples (a), (b) and (c).
a) Separate control point decode logic can be operable to decode an incoming CSR access request and to set the control points which are accessed. The governor 302 can be configured to know how long this takes and can be operable to time the acknowledge packet to arrive afterwards.
b) When the Governor writes into the memory 306, logic can be operable to decode the SRAM address and data bits with knowledge (e.g., from a look up table in the governor 302) from where the control points values reside in the memory 306 and which data bit line contains the information for the control point update.

c) The governor 302 could be configured to issue a signal causing external flops to update when it decodes incoming CSR accesses targeting a register with one or more control points.

The governor 302 can also include logic and mask filters, for example in one or more look up tables (344, see FIG. 15), for protecting the content of the CSR registers. For example, CSR access requests may only be granted access to permitted fields within a CSR register. In this manner, read only fields can be protected.

The governor 302 can also be responsible for reset control of the CSRs, including the initial loading of the register contents from the SPROM 304 into the memory 306 in the case of a fundamental reset (clear all error status) and the preservation of so-called "sticky bits" on other resets that need to preserve error status of selected registers.

As stated above, this invention allows an embodiment of the governor and presentation layer in a variety of implementations. An example of an implementation is outlined in the following.

In one example the governor is operable to access a static RAM which holds the contents of the presentation layer and to provide for efficient and effective use of the memory 306. Duplication of read-only registers in a multi-resource device can be exploited. Rather than repeat common values across the resources, shared read-only register values can be grouped into a shared region 340 of the memory 306. Modifiable registers within the foundation layer can have different values per resource. A unique region 342 of the memory 306 holds those registers and is split into N sub-regions for N sets of foundation resources (resources 1 to N) as illustrated in FIG. 13. Consequently, SRAM storage size can be appreciably reduced in an N-way resource in bus protocols with substantial number of registers which have a common value across resources. The governor decodes a configuration access by the host and indexes into the Shared or Unique Region based upon whether the register holds a common value across resources and the specific foundation resource requested identifiable via BDF (in PCI Express) and the lower address bits.

The governor initializes the memory 306 at power-on reset. Initial values can be stored in non-volatile storage such as the serial PROM 304 shown in FIG. 14. Certain reset conditions (e.g., "sticky" reset) require some fields not be changed from the value held prior to reset. The governor knows which reset has been issued and initializes the appropriate memory entries.

Many register bit fields within writeable configuration space registers are read-only. When the presentation and foundation layers are implemented with random logic, read-only fields are hard-wired to fixed values a specification dictates. To preserve read-only fields within a memory 306 based presentation layer, two mask values per type of register are placed into the write mask filter region 344 of the memory 306 during initialization. An incoming write to a register is logically ANDed with the first mask, the result logically ORed with the second mask, and that result written into the entry of the memory 306 corresponding to the register. The AND mask filter has a 0 in all bit positions which are to remain 0 and 1's in all other bits. The OR mask filter has a 1 in all bit positions which are to remain 1, and 0's in all other bits. The order of the AND and OR operations can be swapped as long as the AND and OR masks are used with the AND and OR logical operation.

A state description of the governor is listed below:
power-on_reset_state
if power_on_reset goto power_on_reset_state
initialize all memory locations with CSR register POR (power-on reset) values
goto monitor_state
conditional_reset_state
if power_on_reset goto power_on_reset_state
initialize only memory locations holding non-preservable registers to POR values
goto monitor_state
monitor_state
if power_on_reset goto power_on_reset_state
else if conditional_reset goto conditional_reset_state
else if status update request, goto foundation_access_state
else if remote host request, goto host_access_state
else goto monitor_state
foundation_access_state
if power_on_reset goto power_on_reset_state
else if conditional_reset goto conditional_reset_state
else write memory with contents of foundation resource status holding register at entry corresponding to status register(s)
goto monitor_state
host_access_state
if power_on_reset goto power_on_reset_state
else if conditional_reset goto conditional_reset_state
else if Read access:
　decode address
　　if access to read-only register common across foundation layer resources, read entry within sharable region of memory and return contents to remote host
　　if access is to register unique per each foundation layer resource, read entry within unique region of memory for the specific resource (e.g., identifiable via BDF in PCI Express) and return contents to remote host
else if Write access:
　decode address
　access write mask filters which correspond to this register type
　perform: TEMP=host_data AND and_mask_filter DATA=TEMP OR or_mask_filter
　write DATA into memory at entry within Unique Region corresponding
　to register within the foundation layer being accessed
　send acknowledge response to remote host timed to arrive after update of memory and all affiliated control points has completed
goto monitor_state In the present example the states of the governor 302 described above can be implemented using hard-wired control logic. It will be appreciated that the governor could also be implemented in other ways, for example the governor could be implemented at least in part by software, operating on a microcontroller, microprocessor or the like.

An embodiment of the invention can provide a hierarchical configuration, for example including virtual P2P bridges with devices beneath. A configuration entity can be employed to assemble the components and can allow partial visibility of the entire structure based upon which remote host is accessing the node.

Figure 15:
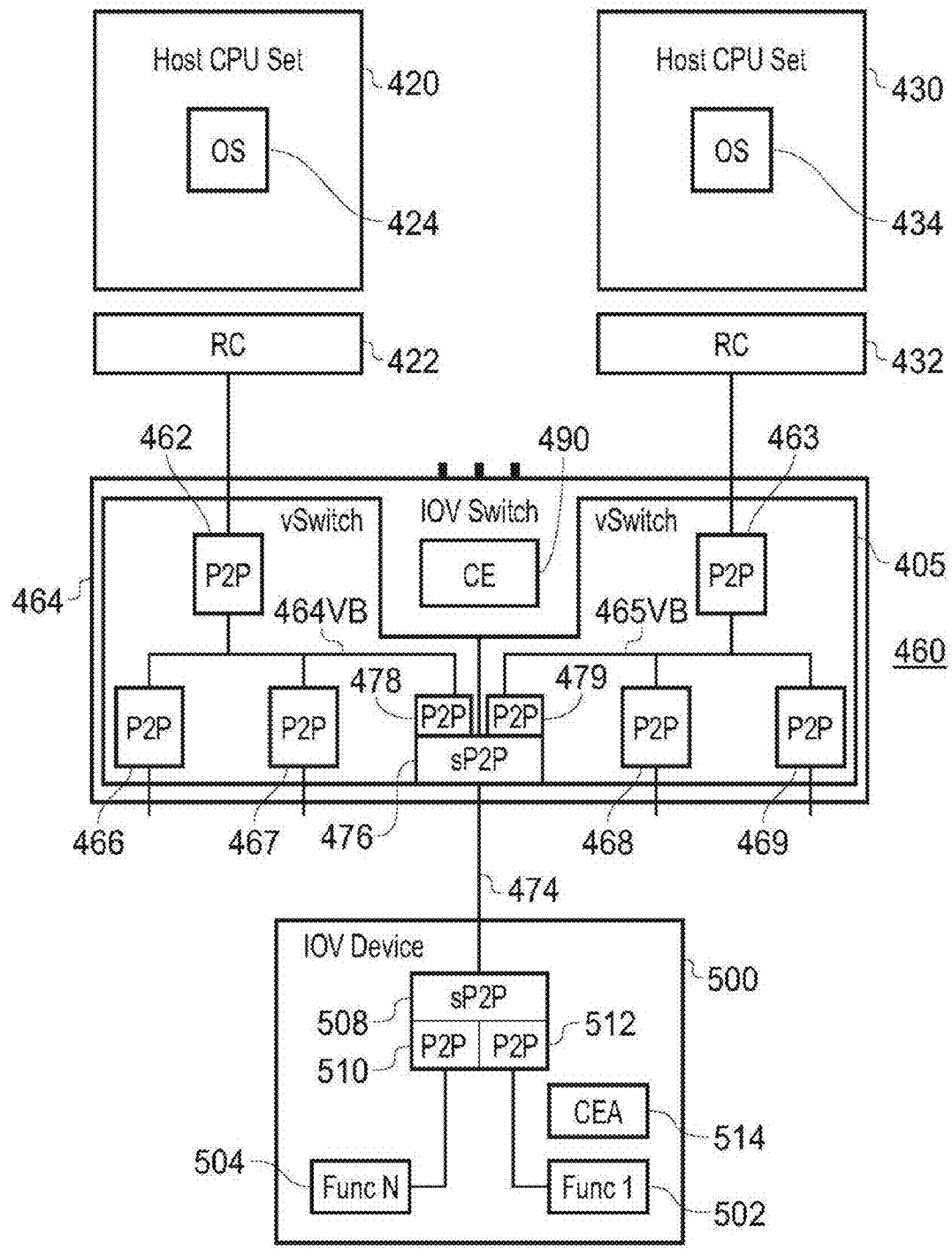
FIG. 15 is a schematic block diagram of a computer system providing device virtualization.

FIG. 15 is a schematic overview of an example embodiment of an interconnect apparatus or device (e.g., a switch) 460 for multi-host PCI-E device sharing. Two hosts 420, 430, operating under an operating system (OS) 424, 434, are connected via RC's 422, 432 to respective upstream ports 462, 463 of a partitioned PCI-E Switch 460. The PCI-E Switch 460 is partitioned into two virtual switches (vSwitches 464, 465). In this example, each virtual switch contains a single upstream port (P2P) 462, 463, possibly one or more downstream non-shared ports (P2P) 466, 467, 468, 469 and one or more shared downstream ports (sP2P) 476. The P2P ports can be described as physical ports. A shared sP2P port 476 is operable to connect to a sharable device 500 (e.g., an I/O device, a switch, etc.) through a shared PCI-E link 474. The shared link is a PCI-E interface 474 shared by multiple virtual switches 464, 465. In this example, each virtual switch 464, 465 attaches to a shared port (sP2P) 476 through one or more P2P bridges 478, 479. The shared port 476 with a bridge 478, 479 associated with a virtual switch 464, 465 can be described as a virtual port as this can provide port virtualization. The shared port 476 contains a routing table, an address translation table (and/or a combined routing and address translation table) and virtual switch separation/protection. The sharable device 500 contains a number of resources 502, 504 that the configuration entity (CE) 490 provisions to the hosts 420, 430. In the present instance, the configuration entity 490 is configured as part of the switch 460 of the interconnect apparatus. The configuration entity could be configured as part of a host or some other entity (e.g., a service processor connected to the interconnect apparatus).

The provisioning of the shared device resources 502, 504 can be determined by an out of band policy. The configuration entity 490 communicates with a configuration entity agent (CEA) 514 in the device that controls device resources that by nature are not sharable, e.g., reset, sharing policy, etc.).

Each resource 502, 504 in the device 500 is represented as a PCI device or a PCI function. The sharable device contains N+1 functions, where N denotes the number of virtual devices the shared device supports, and '1' is the single function allocated for the configuration entity (see also FIGS. 10 to 12).

Functions are provisioned by the configuration entity 490 to hosts 420, 430 (or system images within a host). Re-provisioning of functions to other system images can take place through PCI-E Hot-Remove/-Add interrupt events that the configuration entity 490 initiates through the configuration entity agent 514.

Only a Host 420, 430 or system image currently owning a function is allowed access to a function 502, 504. An access control mechanism per function 502, 504, can be provided.

In addition, to provide transparency for each host, each function is configured to have a separate address space per function (configuration, I/O and memory address spaces per function). The host 420, 430, or system image, performs BAR configuration of the functions it currently owns. This, and the access control mechanism, means that there is no address space overlap per function in the present instance.

A function in a shared device representing a resource 502, 504 (e.g., DMA machine) could be termed a virtual device (vDevice). A virtual device 500 being provisioned to a host 420, 430 can be presented to the Host as a device on the respective virtual PCI bus 464VB, 465VB of the respective virtual switches 464, 465 or as part of a virtual device hierarchy below a P2P port 476 of that virtual switch virtual PCI bus 464VB, 465VB.

Memory and I/O transaction layer packet (TLP) requests in the downward directions (from host to virtual device) can be routed based upon address until the shared port (sP2P) 476 as per the PCI-E specification. At the shared port (sP2P) 476, the Requester ID is replaced with the virtual host ID. Below the shared port (sP2P) 476, the TLP is primarily routed by the virtual host ID and secondarily by address (in case of the latter the virtual host ID is used as address qualifier).

The configuration entity 490 can be operable to control all aspects of a shared I/O device and/or I/O Service (IOU). In a shared device the configuration entity can implement the provisioning of device resources to client hosts.

The presentation layer of FIG. 14 can be configured, for example, as part of the configuration entity 490.

To support a multi-level hierarchy, for example as illustrated with reference to FIG. 15, the governor 302 can be operable to recognize accesses which go through a virtual PCI-to-PCI (P2P) bridge. Such accesses can include fall-through access, where accesses to an endpoint resource in either the presentation or foundation layer do not incur extra latency such as might occur if the packet were traveling through a separately implemented bridge or switch. The governor converts a Type 1 to Type 0 configuration request if the Configuration Entity has composed a P2P bridge with an endpoint beneath and the host's configuration access is to the endpoint bus. Likewise, a PIO access to an element within the endpoint's BAR enabled address space can be decoded and processed directly by the endpoint.

The configuration entity 490 can be operable to connect building blocks including functions and P2P bridges into a composite device as illustrated, for example, in FIG. 12. The governor 302 can be configured to resolve error management, where possible, at the device level.

Bus protocol architecture and design specific implementation determines which levels of a composite device must independently detect, register, or signal errors. Redundant error logic is clearly disadvantageous from a cost perspective. In one efficient implementation, the governor can be operable to signal a detected error within the presentation layer for an embedded P2P bridge when a resource at the foundation layer updates an error status register and there is an overlap between bridge and endpoint error reporting requirements for a given bus architecture. The philosophy behind this implementation is to manage as many errors as possible at the foundation resource level where hardware provisions already exist for error management. Error management requirements common between endpoint and P2P bridge are primarily implemented in the endpoint with the governor updating the P2P presentation layer. This may leave a small number of cases the embedded P2P bridge must individually manage. Another option where a configuration entity is used is for the configuration entity to have resources for error management and update the presentation layer at P2P or endpoint levels as required.

With reference for example to FIGS. 10 to 12, the configuration entity 490 can be operable to provide configuration and partitioning, whereby the presentation layer can present to a remote host several options for a node including:
a) a single function device;
b) a multi-function device;
c) a hierarchal node with a P2P bridge at top and a multi-function device below;
d) a hierarchal node with a P2P bridge at the top, multiple P2P bridges beneath, and devices, either a single or multi-functioned, below the lower P2P bridges;
e) a hierarchal node with a multi-functioned device at top which contains a P2P bridge, one or more additional functions which are not P2P bridges, and beneath the P2P bridge, a structure as c or d above.

The configuration entity 490 can configure a group of device building block resources into an ensemble which provides foundation layer and presentation layer elements for a node.

The configuration entity 490 can configure resource blocks such that each remote host has visibility and access to a specific subset of the resources within the node. To this end the governor 302 can be operable to provide resource masking for supporting device virtualization. Some PCI devices or functions within a device may not be visible to one or more remote hosts performing enumeration on the node. The configuration entity can also provide function renaming as appropriate (e.g., function 1 to function 0).

Multi-host flexibility can be provided for functions (e.g., multiple SRAM tables with the subset of functions configured belonging to the host). The SRAM can be a larger version of single host SRAM with the governor 302 indexing accesses into SRAM based upon a host ID.

Accordingly, there has been described an interconnect apparatus and method for interconnecting at least one host to at least one device and providing a plurality of presentation registers providing a presentation interface for the device to the host, the interconnect apparatus comprising memory for holding the presentation registers and a governor operable to manage the presentation registers in the memory.

An example of the invention can include partitioning the device management into a presentation layer that software uses, which presentation layer defines and allows control of a device through its CSR registers and an underlying, or foundation, layer which directly monitors and manipulates the PCI protocol. Firmware or management software can be employed to configure the components comprising the layers into an integral PCI device.

For example, foundation layer resources can be configured as device functions by a configuration entity or not utilized as configuration requirements dictate. In the example described above, the presentation layer includes an SRAM with a controller. Alternatively, for example, the presentation layer could include a local host DRAM with external logic, for example a local host CPU configured as a controller or governor.

Figure 16:
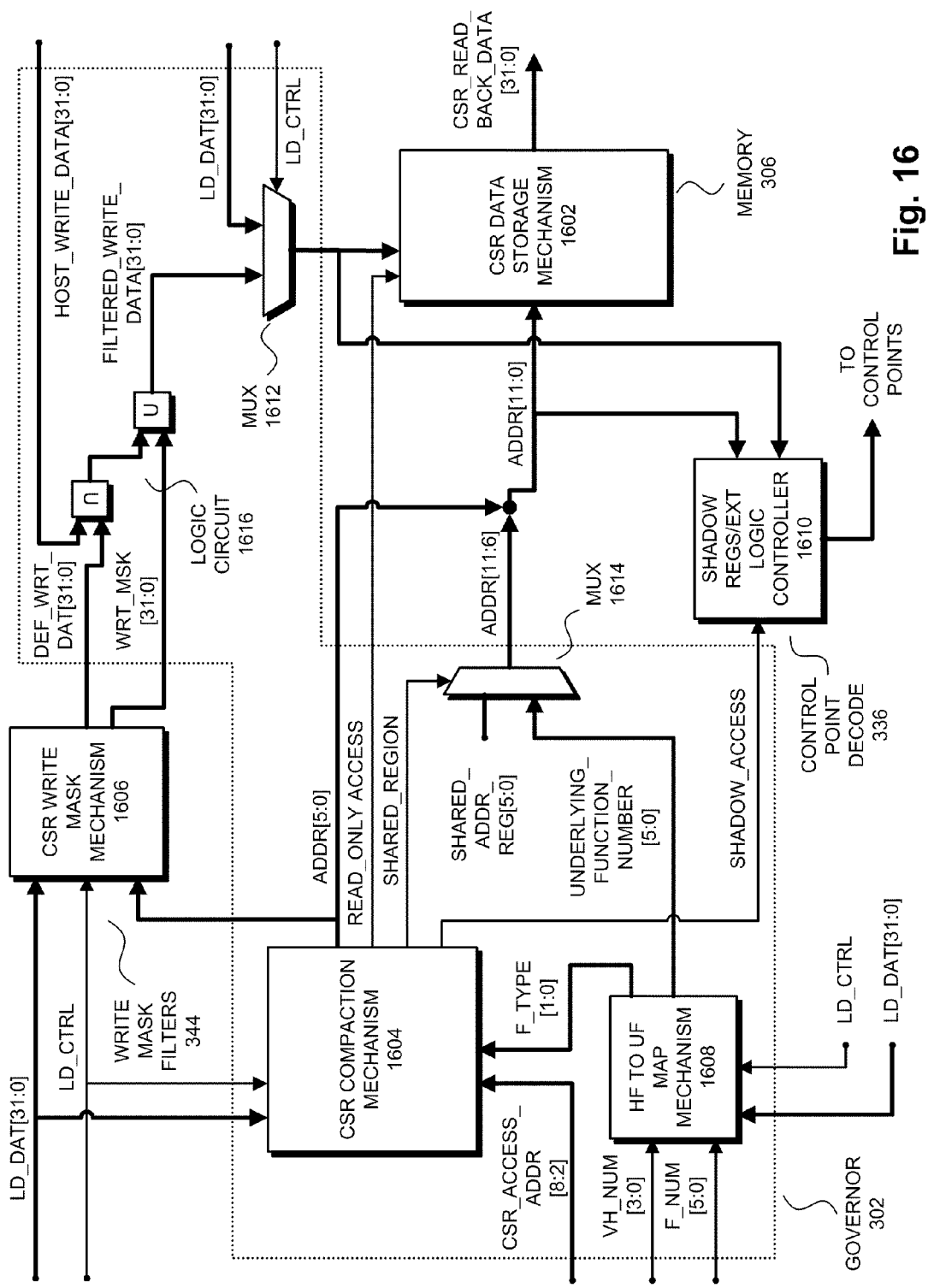
FIG. 16 presents a block diagram of portions of a presentation layer in accordance with the described embodiments.

We now describe embodiments of the present invention that implement a portion of the circuit shown and described above with respect to FIG. 14. More specifically, FIG. 16 presents a block diagram of an implementation of portions of presentation layer 300 in accordance with the described embodiments. Note that we describe these embodiments of presentation layer 300 using a PCIe implementation, including referring to a configuration space and referring to the presentation registers as configuration space registers ("CSRs" or "registers"). However, alternative embodiments can use different terms to describe these functional blocks and/or different arrangements of functional blocks.

As shown in FIG. 16, the described embodiments include CSR data storage mechanism 1602, CSR compaction mechanism 1604, CSR write mask mechanism 1606, HF-to-UF map mechanism 1608, and shadow regs/ext logic controller 1610. In addition, the described embodiments include multiplexers (MUXes) 1612 and 1614, and logic circuit 1616. Each of the elements shown in FIG. 16 can be embodied as a separate circuit (e.g., an ASIC, a field-programmable gate array, etc.). Alternatively, some or all of the elements can be included as part of one or more combined circuit structures (e.g., an integrated circuit chip(s), complex logic devices, etc.). In addition, some or all of the elements can be implemented using a general-purpose circuit to execute program code that configures the general-purpose circuit to perform the described operations (e.g., a microprocessor, a controller, etc.).

For convenience, the elements shown in FIG. 16 are also labeled according to the block(s) within FIG. 14 that can be included within the elements in some embodiments. For example, memory 306 can be included in CSR data storage mechanism 1602 and write mask filters 344 can be included in CSR write mask mechanism 1606, while governor 302 can be included in some or all of the remaining circuit elements, including CSR compaction mechanism 1604, HF-to-UF map mechanism 1608, logic circuit 1616, and the multiplexers 1612 and 1614. Although these circuit elements are described as being included in these blocks from FIG. 14, in alternative embodiments, some or all of the blocks can be included in different elements. For example, governor 302 can be included in more or fewer elements.

CSR data storage mechanism 1602 includes a memory with a number of memory locations that are used for storing the actual copies of configuration space registers (interchangeably "CSRs" or "registers"). More specifically, for each function supported by an associated device, CSR data storage mechanism 1602 can include a soft copy of the function's registers that is used instead of hardware registers (i.e., in place of the hardware registers) for storing the value for the register for the function, as described above. In the described embodiments, CSR data storage mechanism 1602 can store the registers for standard functions, physical functions, and/or virtual functions. Such functions are well known in the art and hence are not described in detail.

In some embodiments, a given memory location in CSR data storage mechanism 1602 can store a value for a configuration space register that is simultaneously used for two or more functions. Specifically, where the value in a register for two or more functions matches (e.g., is the same value), one memory location in CSR data storage mechanism 1602 can be used to hold the value for those registers. This enables the described embodiments to "compact" the memory used to store values for registers by sharing a memory location among two or more function's registers. This, in turn, enables a reduction of the amount of storage required for CSR data storage mechanism 1602 in these embodiments.

Figure 17:
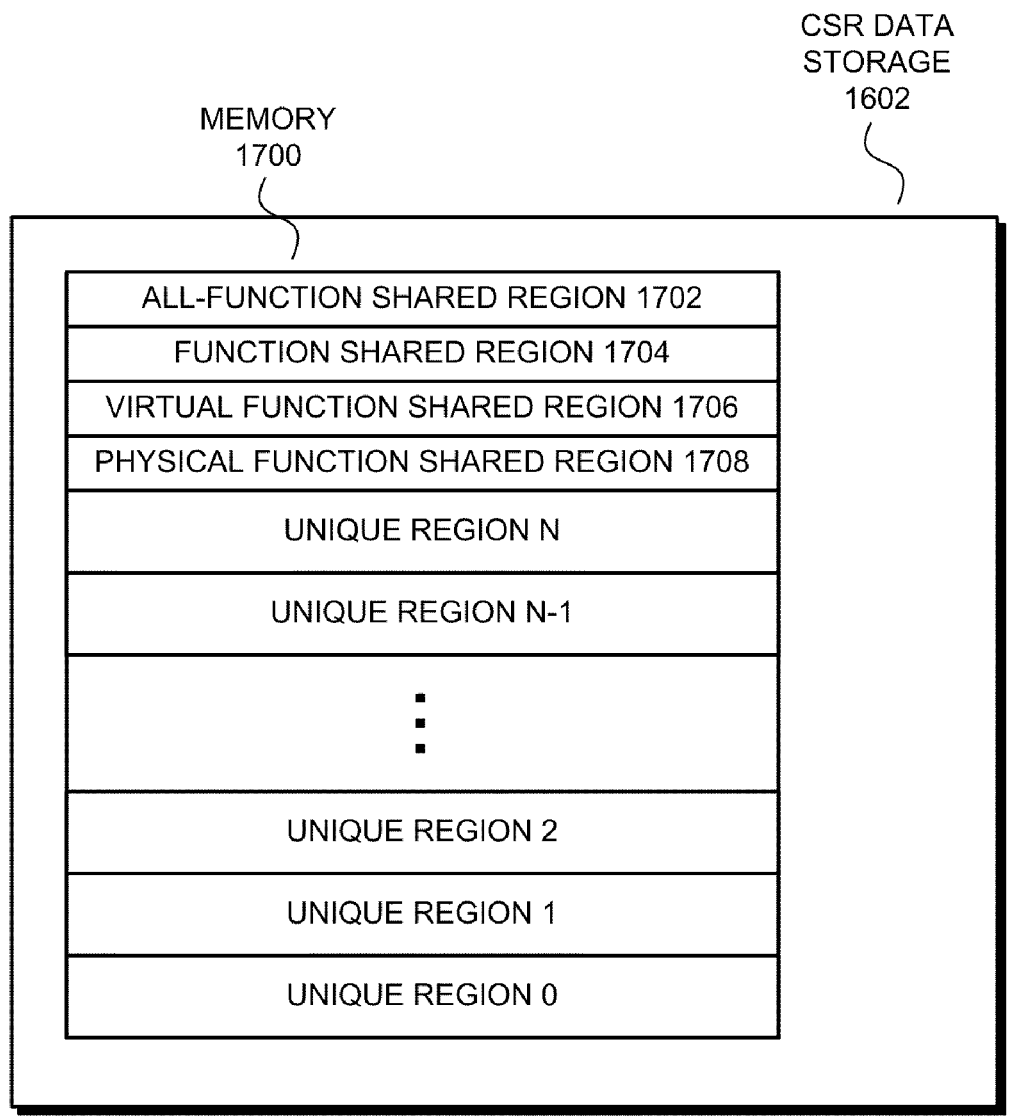
FIG. 17 presents a memory in a CSR data storage mechanism in accordance with the described embodiments.

FIG. 17 presents a memory 1700 in CSR data storage mechanism 1602 in accordance with the described embodiments. Memory 1700 includes SRAM, DRAM, and/or another type of memory that includes a number of memory locations for storing values for actual copies of configuration space registers. In some embodiments, the memory locations contain a predetermined number of bits. For example, the memory locations can be 64 bits, 32 bits, or another number of bits. In some embodiments, the memory locations each contain the same number of bits as the configuration space registers. The memory locations in memory 1700 are addressed using the ADDR[11:0] signal using techniques that are known in the art.

In the illustrated embodiments, memory 1700 is divided into a number of regions. Some regions are used to store values for registers that are shared between two or more functions, while other regions are used to store unique values for registers for a corresponding function. More specifically, in the illustrated embodiment, memory 1700 includes four shared regions, and N unique regions. The N unique regions can include 27, 48, 64, or another number of unique regions. In addition, N can correspond to the total number of functions supported by the design, regardless of the type of function.

In some embodiments, the regions each include a predetermined number of bytes of memory. For example, in some embodiments, the regions for shared memory locations include 256 bytes apportioned evenly among the shared regions, and the unique regions include 12 kb apportioned evenly among 48 unique regions (i.e., with 256 bytes apiece).

The shared memory regions include all function shared region 1702, function shared region 1704, virtual function shared region 1706, and physical function shared region 1708. All function shared region 1702 includes memory locations that contain a value of zero or another predetermined value that are shared between two or more functions (i.e., that are simultaneously used to hold a value for configuration registers for two or more functions, independent of function type).

In the described embodiments, regions 1704-1708 can be shared among specific function types. More specifically, function shared region 1704 includes memory locations that are shared between two or more standard functions. Virtual function shared region 1706 includes memory locations that are shared between two or more virtual functions. Physical function shared region 1708 includes memory locations that are shared between two or more physical functions.

In contrast to the regions for shared memory locations, the N regions for unique memory locations include memory locations for storing values for a particular corresponding function. In these regions, each memory location stores a value for a particular register for a corresponding single function, and the memory locations are not shared between functions.

In some embodiments, some of the memory locations in a unique region may contain a value for some of the registers for a corresponding function, while the function's remaining registers can be included in one or more of the shared regions. For example, assume a given physical function uses a total of N registers. In the described embodiments, these N registers can be compacted by taking advantage of registers that can be shared between functions and stored in M<N memory locations in an associated unique region. In this case, the values for P=N−M registers can be stored in corresponding memory locations in physical function shared region 1708 and/or all function shared region 1702. Thus, in some embodiments, the memory locations used to store values in a given unique region may not be contiguous addresses (i.e., stored in contiguous memory locations), as the value for at least one of the interceding registers is stored in one of the shared regions. Note that in some embodiments, each unique region includes sufficient memory locations to store values for each possible configuration space register for a corresponding function, although some of these memory locations may not be used because the values for the registers are stored in the shared regions.

Referring again to FIG. 16, in some embodiments, CSR compaction mechanism 1604 keeps track of the memory location in which a value for each register for each function is stored. In these embodiments, CSR compaction mechanism 1604 (in combination with other functional blocks, such as HF-to-UF map mechanism 1608) can convert a given register address for a particular function received from a particular host into a portion of an address of a memory location in memory 1700. Depending on the type of function and the register being accessed, a corresponding memory location in memory 1700, and hence the value for the register, may then be accessed for reads or writes. (Note that the value for certain registers in some embodiments is remotely accessed from shadow registers/external logic using shadow regs/ext logic controller 1610, as is described below.)

In some embodiments, host-function-to-underlying-function (HF-to-UF) map mechanism 1608 includes a mapping mechanism for converting VH_NUM[3:0], which is the identity of a requesting host, and F_NUM[5:0], which is the requesting host's function number, into a portion of an internally formatted address that can be used to access a function register in CSR data storage mechanism 1602. As shown in FIG. 16, HF-to-UF map mechanism 1608 generates the function type (F_TYPE[1:0]) and underlying function number (UNDERLYING_FUNCTION_NUMBER[5:0]) signals. The F_TYPE[1:0] signal indicates whether the function being accessed is a standard function, a physical function, or a virtual function. The F_TYPE[1:0] signal is used by CSR compaction mechanism 1604 to implement storage reduction and for generating the ADDR[5:0] signal used as the lower portion of an address for accessing a memory location in CSR data storage mechanism 1602. The UNDERLYING_FUNCTION_NUMBER[5:0] signal is used directly (via MUX 1614) to form the upper portion of an address for accessing a memory location in CSR data storage mechanism 1602.

In the described embodiments, the underlying function number is a number used by a device for a function. A given host's number for the function may not be the same as the device's, so the HF-to-UF map mechanism can convert (via lookup table or other mechanism) the host's function number (F_NUM[5:0]) to the underlying function number (UNDERLYING_FUNCTION_NUMBER[5:0]).

As described above, some memory locations in memory 1700 in CSR data storage mechanism 1602 are shared between two or more functions (e.g., in the shared regions of memory 1700), enabling the reduction of the memory required to store the values for function registers. In some embodiments, CSR compaction mechanism 1604 includes a lookup structure (e.g., a table, a list, a hash or another lookup structure) that can be used to determine an address for a memory location in memory 1700 that contains a value for a given register. In these embodiments, an identification for a register is passed to CSR compaction mechanism 1604 on CSR_ACCESS_ADDR[8:2] and F_TYPE[1:0] (which are the register's address and information about the function type, respectively). CSR compaction mechanism 1604 then accesses the lookup structure to find the appropriate lower-order address bits for the memory location in memory 1700.

Figure 18:
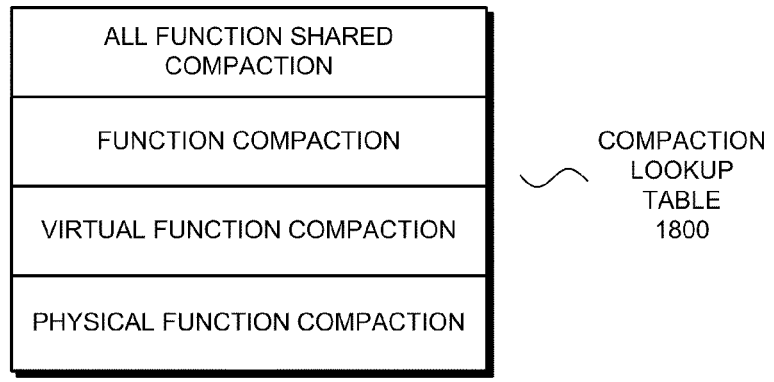
FIG. 18 presents a block diagram of a lookup table in a CSR compaction mechanism in accordance with the described embodiments.

FIG. 18 presents a block diagram of a compaction lookup table 1800 in CSR compaction mechanism 1604 in accordance with the described embodiments. As can be seen in FIG. 18, compaction lookup table 1800 is divided into a function compaction region, a virtual function compaction region, a physical function compaction region, and an all function type shared compaction region. Each of the regions includes K entries for storing the above-described lookup values for CSR compaction mechanism 1604. In some embodiments, the lookup structure is stored in an SRAM, a DRAM, or another type of memory. In some embodiments, the lookup structure is a content addressable memory (CAM).

Figure 19:
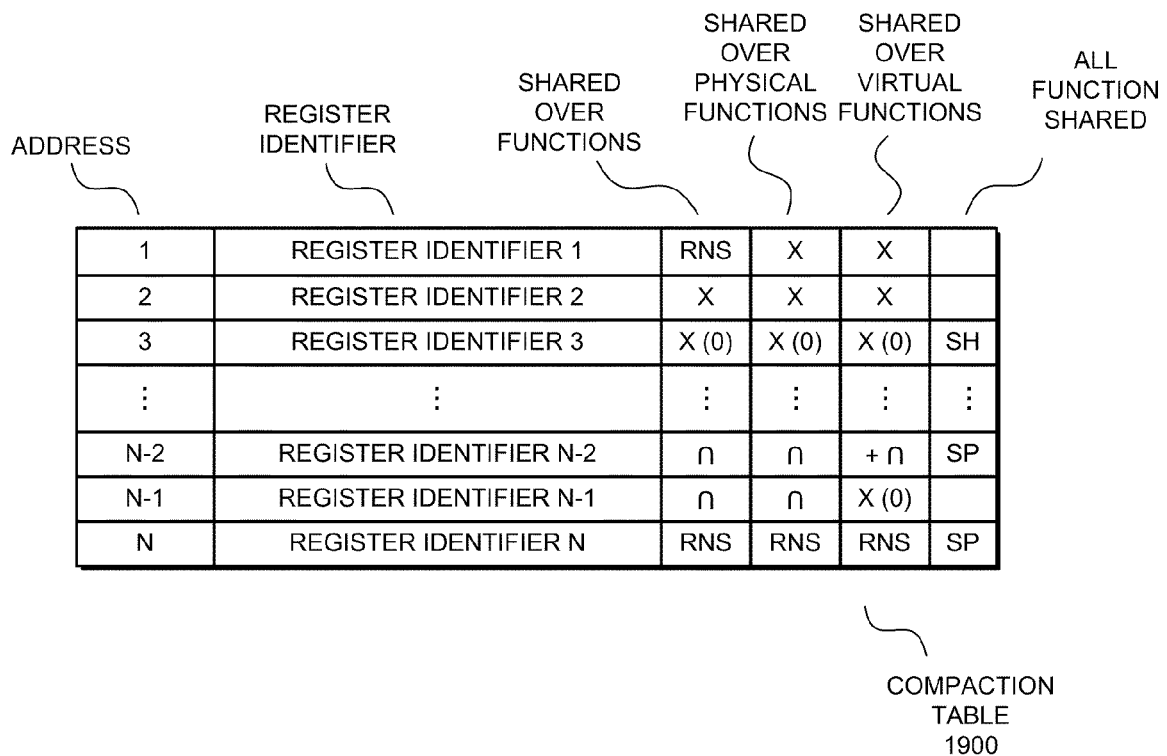
FIG. 19 presents an exemplary compaction table illustrating a compaction of memory that can be achieved in accordance with the described embodiments.

FIG. 19 presents an exemplary compaction table 1900 illustrating a compaction of memory that can be achieved in accordance with the described embodiments. More specifically, compaction table 1900 presents an exemplary portion of a full compaction table for which each entry represents a given register and the fields of each entry indicate whether and how the register can be shared between functions. As can be seen in FIG. 19, each entry represents a given register which can be either a standard, physical, or virtual function and includes: (1) a register address field; (2) a register identifier field; (3) a shared over functions field; (4) a shared over physical functions field; (5) a shared over virtual functions field; and (6) an all function shared field.

The address field in each entry contains the address of the register for the corresponding function(s). Note that, for simplicity in describing the compaction table, we use basic addresses, e.g., 1, 2, etc., and describe only a small portion of the possible addresses/entries that could be present in a full compaction table.

The register identifier field identifies the name of the CSR type whose contents are stored for the function(s) in the data storage memory location at the affiliated address which is partially generated by the compaction mechanism. In some embodiments, within the compaction table, these entries contain identifiers such as device identification (ID), vendor ID, base address register, class code, revision ID, or other registers that can be used to configure, control, and communicate with the corresponding function(s). Although a large number of register identifiers can be imagined by one of skill in the art, we present a number of dummy register identifiers (e.g., "register identifier 1") for the purpose of description.

The four "shared over" fields, i.e., shared over functions, shared over physical functions, shared over virtual functions, and all function type shared, indicate whether and how the register can be shared between standard functions, physical functions, virtual functions, and all function types, respectively. As is shown in FIG. 19, compaction table 1900 can include a number of indicators that can be stored in the shared over fields to indicate whether and how the register can be shared for the corresponding function type. These entry indicators are for housekeeping, the compaction mechanism issues an output reflecting final policy.

For example, in entry 1, the shared over functions field includes the "RNS" indicator, which indicates that the corresponding register is read-only non-shareable for standard functions. Hence, for a given device, the register value must be stored in a separate location in memory 1700 for each standard function. More specifically, for a given standard function, the register must be stored at the corresponding address in the function's unique region in memory 1700. In addition, the register cannot be overwritten with a different value.

In addition, the shared over physical functions and shared over virtual functions fields for the first entry include the "X" indicator, which indicates that the register can be shared between the indicated function (i.e., that the column heading applies). Thus, the value for this register can be found in the corresponding shared region of memory 1700. For example, register identifier 1 for physical functions for a device can be found in physical function shared region 1708. For the second entry (i.e., address "2"), the three shared over fields each include an X, which indicates that the register can be shared between standard functions, physical functions, and virtual functions, respectively. Thus, the memory location in memory 1700 used to store the value for the register is found in a corresponding shared region for each of the function types.

With respect to the remaining entries, an X(0) indicates that the function can be shared between the corresponding functions, and that the register is a read-only zero register. In these cases, the value for the register can be stored in all function shared region 1702 of memory 1700. The ∩ indicates that the value for the corresponding register is accessed in a shadow regs/ext logic controller 1610 (described in more detail below). The "+" that accompanies the ∩ in the shared over virtual functions field of the N−2 entry in compaction table 1900 indicates that the register requires a unique virtual function (VF) write mask from CSR write mask mechanism 1606. This can be implemented with a special compaction mechanism output which differentiates compaction address outputs.

The all function shared field indicates registers for which all registers are shareable (SH) or are separate (SP). For example, it can be seen that the N−2 entry in compaction table 1900 is all separate, or SP. For these registers, the value in the register for a given function can be found in the function's unique region. In contrast, for the registers marked SH, the value in the register for a given function can be found in all function shared region 1702.

Referring again to FIG. 16, it can be seen that the CSR compaction mechanism 1604 generates the SHARED_REGION signal. The SHARED_REGION signal controls the source of the six upper address bits (ADDR[11:6]) that are used to access a given function's register value within memory 1700. Specifically, the SHARED_REGION signal determines which input of MUX 1614 is passed to the output to be used as ADDR[11:6]. If CSR compaction mechanism 1604 determines that the value for a register for a given function is in a unique region, CSR compaction mechanism 1604 deasserts the SHARED_REGION signal to cause the UNDERLYING_FUNCTION_NUMBER[5:0] signal to be used to generate the upper six bits of the address, ADDR[11:6]. Otherwise, CSR compaction mechanism 1604 asserts the SHARED_REGION signal to cause the shared address region (SHARED_ADDR_REG[5:0]) signal to be used as the ADDR[11:6] bits.

The ADDR[5:0] signal generated by CSR compaction mechanism 1604 and the ADDR[11:6] signal output from MUX 1614 are combined into the ADDR[11:0] signal to form addresses used by CSR data storage mechanism 1602 for accessing memory locations for register values. In some embodiments, combining these signals involves routing the appropriate individual signal lines of the ADDR[11:0] bus from CSR data storage mechanism 1602 to MUX 1614 and CSR compaction mechanism 1604.

CSR write mask mechanism 1606 can provide write masks (WRT_MSK[31:0]) and/or default write values (DEF_WRT_DAT[31:0]) that can be used to: (1) provide default data for writing predetermined values to one or more bits in a corresponding memory location in memory 1700; or (2) prevent writes to partially or completely read-only registers from incorrectly overwriting the corresponding value in the memory location in memory 1700. For a given register access request, CSR write mask mechanism receives the ADDR[5:0] bits generated by CSR compaction mechanism 1604. Based on the ADDR[5:0] bits, CSR write mask mechanism 1606 determines if a write mask and/or default write data exists for the corresponding memory location. If so, CSR write mask mechanism 1606 outputs the write masks and/or the default write data on the WRT_MSK[31:0] output and/or DEF_WRT_DAT[31:0] output, respectively, that feed into the logic circuit 1616.

In some embodiments, CSR compaction mechanism 1604 also outputs the READ_ONLY_ACCESS_signal. The READ_ONLY_ACCESS_signal can be used to override any default write data or write mask acquired from CSR write mask mechanism 1606. In these embodiments, the READ_ONLY_ACCESS signal, when asserted, causes CSR data storage mechanism 1602 to block all attempted writes to the memory location indicated by ADDR[11:0]. CSR compaction mechanism 1604 can assert the READ_ONLY_ACCESS signal for a given memory location based on a value in compaction lookup table 1800 (see FIG. 18), or based on anther determined or computed value.

Along with the write masks and default write data, logic circuit 1616 receives HOST_WRITE_DATA[31:0]. Logic circuit 1616 logically combines the write masks and/or the default write data with HOST_WRITE_DATA[31:0] to form FILTERED_WRITE_DATA[31:0], which can then be used by CSR data storage mechanism 1602 to write the corresponding memory location for the register in memory 1700.

For example, assume a register R for which the value is stored in memory location ML in memory 1700. Further assume that R can only be partially written, e.g., only a lower portion of the bits in the register are allowed to be overwritten with data from a host and the remaining bits are read-only. In this embodiment, CSR write mask mechanism 1606 can provide a write mask with zeros (or ones) in the bits of the write mask where the corresponding bit of the memory location in memory 1700 cannot be written and ones (or zeros) in the other bits.

As another example, assume a register R2 for which the value is stored in memory location ML2 in memory 1700. Further assume some or all of the bits in R2 have default write data, i.e., if the memory location for the register is written by a host, the predetermined set of bits should have a predetermined value written to them. In this embodiment, CSR write mask mechanism 1606 can provide default write data for the set of bits for the memory location in memory 1700.

Note that CSR write mask mechanism 1606 can provide only a write mask or only default write data, or can provide both a write mask and default data for a write of a corresponding memory location in memory 1700.

In these embodiments, logically combining the HOST_WRITE_DATA[31:0] and the write mask and/or the default write data involves performing one or more AND operations, OR operations, and/or other logical operations. For example, in some embodiments, if provided, the write mask can be bitwise-ANDed with the HOST_WRITE_DATA[31:0] signal to prevent zeroed bits in the write mask from being passed to FILTERED_WRITE_DATA[31:0]. In some embodiments, if provided, the default write data can be bitwise-ORed with the HOST_WRITE_DATA[31:0] signal to ensure that any ones in the default write data are passed to FILTERED_WRITE_DATA[31:0] or bitwise ANDed to ensure that any zeros in the default write data are passed to FILTERED_WRITE_DATA[31:0].

In some embodiments, CSR write mask mechanism 1606 uses a lookup table to store and retrieve write masks and default write data. FIG. 20 presents a block diagram of a lookup structure 2000 in CSR write mask mechanism 1606 in accordance with the described embodiments. In some embodiments, lookup structure 2000 includes a memory (e.g., an SRAM or a DRAM) that can store a number of write masks and write data. In these embodiments, lookup structure 2000 can include one or more mechanisms for looking up write masks and default write data (e.g., a CAM, a list, or another structure). In the embodiment shown in FIG. 20, lookup structure 2000 includes N entries (e.g., 64, 32, 25, or another number of entries), each of which includes a field for an address, a field for default write data, and a field for a write mask.

In the illustrated embodiments, the address field includes a portion of the address where the value for the register is stored in memory 1700 in CSR data storage mechanism 1602 (which can be addressed using ADDR[5:0]). The fields for the write mask and the write data can include the above-described write mask and write data, respectively. In cases where only a write mask or only default write data exists for an entry, the other field can contain a specified value or can be marked (e.g., using a valid bit (not shown)) as invalid.

In some embodiments, one or more shadow registers (e.g., separate hardware registers) and/or external logic (collectively "external registers") can store and/or control the value for a given register for a function. These external registers can be used for register values that are to be read quickly by external devices/processors, the OS, etc. For example, in some embodiments, an external register can be included for a function that indicates whether the function is currently enabled or disabled. In these embodiments, the device can be, for example, a network device, and the function can be a data input/output (I/O) function for a network device. These embodiments can include an external register that contains a value indicating whether the I/O function is enabled or disabled. The external register can be quickly read by external devices, the OS, etc. to determine if the I/O function is available.

In some embodiments, a shadow registers-external logic control mechanism, shadow regs/ext logic controller 1610, is used to communicate with the external registers. In these embodiments, upon determining from the CSR access address and the function number that an external register is to be accessed, CSR compaction mechanism 1604 asserts a signal on the SHADOW_ACCESS output to indicate that the value in the external register is being accessed. Shadow regs/ext logic controller 1610 then reads the ADDR[11:0] and, if the access is a write, the write data line from MUX 1612, and then accesses the indicated external register.

Figure 21:
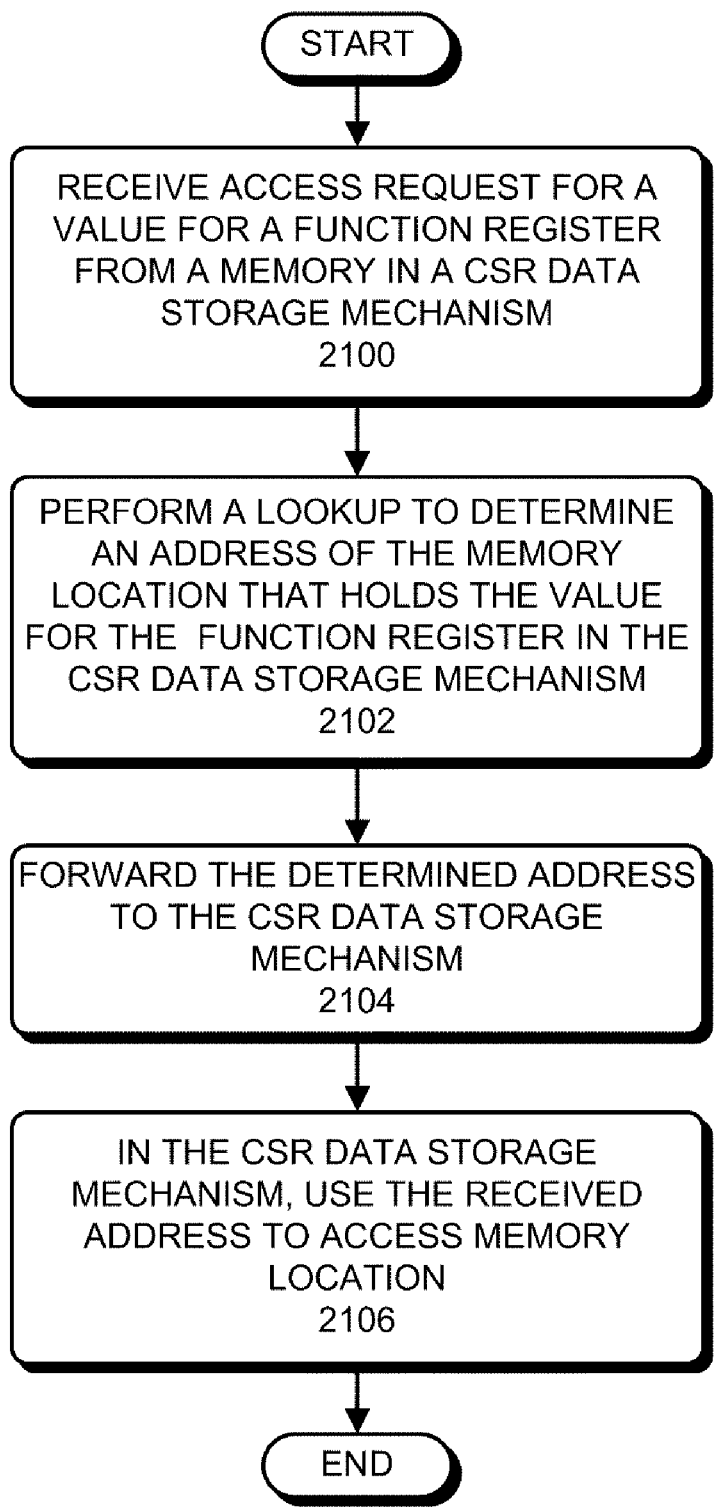
FIG. 21 presents a flowchart illustrating a process for accessing a memory location used for storing a value for a configuration space register in accordance with the described embodiments.

FIG. 21 presents a flowchart illustrating a process for accessing a memory location used for storing a value for a configuration space register (interchangeably "a CSR" or "a register"). The process starts when an OS or another entity (e.g., processor or another device) sends an access request for a memory location in CSR data storage mechanism 1602 that contains a value for a register for a corresponding function (step 2100). The access request includes CSR_ACCESS_ADDR[8:2], VH_NUM[3:0], and F_NUM[5:0], which identify the register to be accessed, the host, and the host's function number, respectively. The access request is then forwarded to CSR compaction mechanism 1604 and to HF-to-UF map mechanism 1608 to perform a lookup for an address of a memory location in CSR data storage mechanism 1602 for the value for the register (step 2102).

Upon receiving the request, HF-to-UF map mechanism 1608 queries an internal lookup structure to determine an underlying function number and a function type. The determined function type is then forwarded to CSR compaction mechanism 1604 on the F_TYPE[1:0] output and the underlying function number is forwarded to MUX 1614 on the UNDERLYING_FUNCTION_NUMBER[5:0] output. Note that the underlying function number is an internal ID used to uniquely identify the function regardless of host or function type and is used by CSR compaction mechanism 1604 and CSR data storage mechanism 1602.

Next, CSR compaction mechanism 1604 uses CSR_ACCESS_ADDR[8:2] and F_TYPE[1:0] to look up a lower portion of an access address for a memory location that holds the value for the register in CSR data storage mechanism 1602. CSR compaction mechanism 1604 then forwards the lower portion of the access address on the output ADDR[5:0] to CSR data storage mechanism 1602.

In addition to looking up the lower portion of the access address for the memory location, CSR compaction mechanism 1604 determines if the register is a register that can be shared between functions. If so, the register is located in a shared region in memory 1700 in CSR data storage mechanism 1602. In this case, CSR compaction mechanism 1604 asserts the SHARED_REGION signal to cause MUX 1614 to forward a value on the SHARED_ADDR_REG[5:0] signal as the upper bits, ADDR[11:6], of the access address ADDR[11:0] for the memory location in CSR data storage mechanism 1602. Otherwise, if the register is located in a unique region (i.e., if the register is unique to the function and is not shared), CSR compaction mechanism 1604 deasserts the SHARED_REGION signal to cause MUX 1614 to forward the value on UNDERLYING_FUNCTION_NUMBER[5:0] as the upper bits, ADDR[11:6], of the access address ADDR[11:0] for the memory location in CSR data storage mechanism 1602. The full address for the memory location is then forwarded to CSR data storage mechanism to access the value for the register (step 2104). Note that as described above, the full address (ADDR[11:0]) is used to address the memory location for the register. In other words, the address, as it is generated from CSR compaction mechanism 1604 and HF-to-UF mapping mechanism 1608, is a complete address for looking up a memory location in CSR data storage mechanism 1602, regardless of the region where the memory location is apportioned.

CSR data storage mechanism 1602 then uses the received address to access the memory location where the register's value is located (step 2106). If the access is a read, CSR data storage mechanism can retrieve and return the value for the register via the CSR_READ_BACK_DATA[31:0] signal.

On the other hand, if the access is a write (of host data) for the register to the memory location, CSR data storage mechanism 1602 also receives write data for the memory location. For example, in the illustrated embodiments, HOST_WRITE_DATA[31:0] can be passed through logic circuit 1616 to be logically combined with any write mask and/or default write data available for the memory location, and the resulting write data, FILTERED_WRITE_DATA[31:0], can be forwarded from MUX 1612 to CSR data storage mechanism 1602 for the write operation. In these embodiments, CSR write mask mechanism 1606 can perform a lookup using the ADDR[5:0] signal to determine if any write mask and/or default write data exist for the indicated address, and can output the write mask and/or default write data to logic circuit 1616 to enable the logical combination of the write mask and/or default write data with the host write data on HOST_WRITE_DATA[31:0].

In some cases, the access request is directed to a shadow register or external logic. For example, for a register that must be accessible very quickly (i.e., more quickly than accessing a register in CSR data storage mechanism 1602) or for an external register, the access can be to a separate hardware register or to a separate dedicated memory location that contains the value for the register. In these cases, CSR compaction mechanism 1604 determines that the access is to the shadow register and/or external logic and asserts the SHADOW_ACCESS signal. The asserted SHADOW_ACCESS signal is detected by the shadow regs/ext logic controller 1610, which uses the address ADDR[11:0] (generated as described above) to determine which shadow register and/or external logic to access and forwards the access request to external control points Note that if the access is a write, shadow regs/ext logic controller 1610 can also access the write data from the output of MUX 1612 (i.e., the write data generated in logic circuit 1616 from HOST_WRITE_DATA [31:0]).

In some embodiments, the value in the shadow register/external logic is also present in a corresponding memory location in CSR data storage mechanism 1602. However, when reading the value from the register, these embodiments can preferentially read the shadow register and/or external logic. Reads are almost always read from CSR data storage mechanism 1602. Writes can be sent both to CSR data storage mechanism 1602 and any shadow register.

In addition to accessing the registers as described above with respect to FIG. 21, some embodiments include a mechanism for loading data into the memories, lookup tables, etc. into some or all of the elements shown in FIG. 16 (e.g., CSR data storage mechanism 1602, CSR compaction mechanism 1604, CSR write mask mechanism 1606, HF-to-UF map mechanism 1608, and shadow regs/ext logic controller 1610). In these embodiments, at startup, upon reset, or at another predetermined event (i.e., error, interrupt, etc.), the data can be loaded to initialize or replace data present in these elements.

These embodiments include the LD_DAT[31:0] and LD_CTRL signals that are used to load the data into the elements. LD_DAT [31:0] and LD_CTRL can be used in conjunction with the address generation performed by CSR compaction mechanism 1604 and HF-to-UF map mechanism 1608 when performing the write. For example, each access address can be passed in through the CSR_ACCESS_ADDR [8:2], VH_NUM[3:0], and F_NUM[5:0] signals to generate the appropriate memory location address as described above, and the LD_CTRL signal can be asserted to indicate that a write is occurring and that the write data is coming from the LD_DAT[31:0] signal. The element that is to be written then uses the access address to determine where the LD_DAT[31:0] is to be written. Note that in these embodiments, any data in any of the elements, including register values, default write data, write masks, lookup table values, etc., can be written using this mechanism.

In some embodiments, the load operation is an initialization operation and LD_DAT[31:0] is retrieved from a read-only memory (a ROM such as SPROM 304 in FIG. 14) that holds the initial values for some or all of the elements shown in FIG. 16. In some embodiments, the load operation is performed by a service processor or by another device in the system.

Although we describe the embodiments using particular numbers of bits, numbers of functional blocks, and arrangements of elements, alternative embodiments may use different numbers of bits, numbers of functional blocks, and/or numbers of elements to perform the operations. In addition, although throughout the specification we describe "some embodiments," each reference to some embodiments can refer to a different subset of embodiments within the described embodiments, can refer to some of the same embodiments or can refer to all of the same embodiments.

Moreover, although the embodiments above have been described in considerable detail, numerous variations and modifications will become apparent to those skilled in the art once the above disclosure is fully appreciated. It is intended that the following claims be interpreted to embrace all such variations and modifications as well as their equivalents.

What is claimed is:

1. An apparatus for accessing values for configuration space registers (CSRs) for a device, comprising:
    a CSR data storage mechanism having an address input and a CSR data output;
    a memory in the CSR data storage mechanism that comprises a plurality of memory locations for storing actual copies of values for CSRs for functions for corresponding devices that are associated with a device interface, wherein the memory locations are divided into at least one shared region and at least one unique region; and
    a CSR compaction mechanism that comprises a lookup structure, wherein the CSR compaction mechanism is configured to use a CSR address and a function type value to determine, using the lookup structure, a lower portion of an address for a memory location in the memory that contains a value for a corresponding CSR;
    wherein responsive to receiving an address comprising the lower portion of the address for the memory location and an upper portion of the address for the memory location on the address input, the CSR data storage mechanism is configured to access the value for the CSR in the memory location in a corresponding shared region or unique region.

2. The apparatus of claim 1, wherein the CSR compaction mechanism further comprises a shared region output, and wherein the apparatus further comprises:

a region select multiplexer (MUX) having an underlying function number input, a shared address region input, a select input, and an address output, wherein the select input is coupled to the shared region output of the CSR compaction mechanism, and the address output is coupled to the address input of the CSR data storage mechanism;

wherein the CSR compaction mechanism is configured to assert a signal on the shared region output when the CSR address and the function type input indicate a CSR for which the value is stored in a shared region in the memory in the CSR data storage mechanism; and wherein when the signal on the shared region output is asserted, the region select MUX is configured to pass a value on the shared address region input to the address output as the upper portion of the address for the memory location;

otherwise, the region select MUX is configured to pass a value on the underlying function number input to the address output as the upper portion of the address for the memory location.

3. The apparatus of claim 2, further comprising:

a mapping mechanism having a host number input, a function number input, an underlying function number output, and a function type output, wherein the host number input is coupled to a host number signal, the function number input is coupled to a function number signal, the function type output is coupled to the function type input of the CSR compaction mechanism, and the underlying function number output is coupled to the underlying function number input of the region select MUX;

wherein responsive to receiving a host number on the host number input and a function number on the function number input, the mapping mechanism is configured to output a function type on the function type output and an underlying function number on the underlying function number output.

4. The apparatus of claim 1, further comprising:

a CSR write mask mechanism having an address input, a write mask output, and a write data output, wherein the address input is coupled to the address output of the CSR compaction mechanism;

wherein responsive to receiving an address for a CSR that comprises zero or more read-only bits, the CSR write mask mechanism is configured to output a write mask on the write mask output; and wherein responsive to receiving an address for a CSR that comprises zero or more bits that use default write data, the CSR write mask mechanism is configured to output default write data on the write data output.

5. The apparatus of claim 4, further comprising:

a logic circuit having a write mask input, a host write data input, a default write data input, and filtered write data output, wherein the write mask input is coupled to the write mask output of the CSR write mask mechanism, the default write data input is coupled to write data output of the CSR write mask mechanism, and the host write data input is coupled to a host write data signal;

wherein the logic circuit is configured to perform one or more bitwise operations to logically combine the write mask and the default write data with the host write data and output a resulting filtered write data on the filtered write data output.

6. The apparatus of claim 5, wherein the CSR data storage mechanism further comprises a write input, and wherein the apparatus further comprises a write select MUX having a load data input, a filtered write data input, a select input, and a write data output, wherein the load data input is coupled to a load data signal, the filtered write data input is coupled to the filtered write data output of the logic circuit, and the select input is coupled to a load data control signal;

wherein when the control signal on the load data control signal is asserted, the write select MUX is configured to pass the load data signal to the write data output to be written to the CSR data storage mechanism;

otherwise, the write select MUX passes a filtered write data signal to the write output to be written to the CSR data storage mechanism.

7. The apparatus of claim 6, wherein the CSR compaction mechanism, the CSR write mask mechanism, the mapping mechanism, and the control point circuit each have a load data input and a load data control input, wherein each load data input is coupled to a load data signal and each load data control input is coupled to the load data control signal;

wherein upon receiving a predetermined load data control signal on the load data control input, the CSR data storage mechanism, the CSR compaction mechanism, the CSR write mask mechanism, the mapping mechanism, or the control point circuit are configured to write the load data to a corresponding memory location.

8. The apparatus of claim 1, wherein the CSR compaction mechanism further comprises a shadow access output, and the apparatus further comprises:

a control point circuit having a shadow access input, an address input, and a control point output, wherein the shadow access input is coupled to the shadow access output of the CSR compaction mechanism, and wherein the address input is coupled to the address input of the CSR data storage mechanism;

wherein responsive to receiving a CSR access address and a function type that indicate that one or more of a shadow register or external logic is used to access the value for the CSR, the CSR compaction mechanism is configured to assert a signal on the shadow access output to cause the control point circuit to access the shadow register or external logic.

9. The apparatus of claim 1, wherein the CSR compaction mechanism further comprises a read-only access output and the CSR data storage mechanism further comprises a read-only access input, wherein the read-only access output of the CSR compaction mechanism is coupled to the read-only input of the CSR data storage mechanism;

wherein responsive to receiving a CSR access address and a function type that indicate a memory location in the CSR data storage mechanism that contains a read-only value, the CSR compaction mechanism is configured to assert a signal on the read-only access line to cause the CSR data storage mechanism to prevent the memory location from being overwritten.

10. A computing device that accesses values for configuration space registers (CSRs) for a device interface, comprising:

a processor;

a CSR data storage mechanism coupled to the processor, wherein the CSR data storage mechanism has an address input and a CSR data output;

a memory in the CSR data storage mechanism that comprises a plurality of memory locations for storing actual copies of values for configuration space registers for functions for corresponding devices that are associated with a device interface, wherein the memory locations are divided into at least one shared region and at least one unique region; and a CSR compaction mechanism that comprises a lookup structure, wherein the CSR compaction mechanism is configured to use a CSR address and a function type value to determine, using the lookup structure, a lower portion of an address for a memory location in the memory that contains a value for a corresponding CSR;

wherein responsive to receiving an address comprising the lower portion of the address for the memory location and an upper portion of the address for the memory location on the address input, the CSR data storage mechanism is configured to access the value for the CSR in the memory location in a corresponding shared region or unique region.

11. The computing device of claim 10, wherein the CSR compaction mechanism further comprises a shared region output, and wherein the apparatus further comprises:

a region select multiplexer (MUX) having an underlying function number input, a shared address region input, a select input, and an address output, wherein the select input is coupled to the shared region output of the CSR compaction mechanism and the address output is coupled to the address input of the CSR data storage mechanism;

wherein the CSR compaction mechanism is configured to assert a signal on the shared region output when the CSR address and the function type input indicate a CSR for which the value is stored in a shared region in the memory in the CSR data storage mechanism; and wherein when the signal on the shared region output is asserted, the region select MUX is configured to pass a value on the shared address region input to the address output as the upper portion of the address for the memory location;

otherwise, the region select MUX is configured to pass a value on the underlying function number input to the address output as the upper portion of the address for the memory location.

12. The computing device of claim 11, further comprising:

a mapping mechanism coupled to the processor having a host number input, a function number input, a function type output, and an underlying function number output, wherein the host number input is coupled to a host number signal from the processor, the function number input is coupled to a function number signal from the processor, the function type output is coupled to the function type input of the CSR compaction mechanism, and the underlying function number output is coupled to the underlying function number input on the region select MUX;

wherein responsive to receiving a host number on the host number input and a function number on the function number input, the mapping mechanism is configured to output a function type on the function type output and an underlying function number on the underlying function number output.

13. The computing device of claim 10, further comprising:

a CSR write mask mechanism having an address input, a write mask output, and a write data output, wherein the address input is coupled to the address output of the CSR compaction mechanism;

wherein responsive to receiving an address for a register that comprises zero or more read-only bits, the CSR write mask mechanism is configured to output a write mask on the write mask output; and wherein responsive to receiving an address for a register that comprises zero or more bits that use default write data, the CSR write mask mechanism is configured to output default write data on the write data output.

14. The computing device of claim 13, further comprising:

a logic circuit having a write mask input, a host write data input, a default write data input, and filtered write data output, wherein the write mask input is coupled to the write mask output of the CSR write mask mechanism, the default write data input is coupled to write data output of the CSR write mask mechanism, and the host write data input is coupled to a host write data signal;

wherein the logic circuit is configured to perform one or more bitwise operations to logically combine the write mask and the default write data with the host write data and output a resulting filtered write data on the filtered write data output.

15. The computing device of claim 14, wherein the CSR data storage mechanism further comprises a write input, and wherein the apparatus further comprises a write select MUX having a load data input, a filtered write data input, a select input, and a write data output, wherein the load data input is coupled to a load data signal, the filtered write data input is coupled to the filtered write data output of the logic circuit, and the select input is coupled to a load data control signal;

wherein when the control signal on the load data control signal is asserted, the write select MUX is configured to pass the load data signal to the write data output to be written to the CSR data storage mechanism;

\otherwise, the write select MUX passes a filtered write data signal to the write output to be written to the CSR data storage mechanism.

16. The computing device of claim 15, wherein the CSR compaction mechanism, the CSR write mask mechanism, the mapping mechanism, and the control point circuit each have a load data input and a load data control input, wherein each load data input is coupled to a load data signal and each load data control input is coupled to the load data control signal;

wherein upon receiving a predetermined load data control signal on the load data control input, the CSR data storage mechanism, the CSR compaction mechanism, the CSR write mask mechanism, the mapping mechanism, or the control point circuit are configured to write the load data to a corresponding memory location.

17. The computing device of claim 10, wherein the CSR compaction mechanism further comprises a shadow access output, and the apparatus further comprises:

a control point circuit having a shadow access input, an address input, and a control point output, wherein the shadow access input is coupled to the shadow access output of the CSR compaction mechanism, and wherein the address input is coupled to the address input of the CSR data storage mechanism;

wherein responsive to receiving a CSR access address and a function type that indicate that one or more of a shadow register or external logic is used to access the value for the CSR, the CSR compaction mechanism is configured to assert a signal on the shadow access output to cause the control point circuit to access the shadow register or external logic.

18. A method for using a configuration space register (CSR) storage mechanism to access values for function registers for devices associated with a device interface, wherein the CSR storage mechanism comprises a memory that includes a plurality of memory locations used to store actual copies of function registers, wherein the memory is divided into at least one shared region and at least one unique region, comprising:

receiving an access request for a value for a function register, wherein the access request includes an identification of the register and a function;

performing a lookup to determine an address for a memory location in the CSR storage mechanism where the value for the register is stored, wherein performing the lookup involves using the identification of the register and the function to determine if the memory location where the register is stored is in a shared region or a unique region;

providing an address in a shared region for function register values that are located in a shared region or providing an address in a unique region for function register values that are located in a unique region, wherein the addresses in the shared region and the unique region comprise an upper portion and a lower portion; and using the determined address to access the value for the function's register in a corresponding memory location the shared region or the unique region in the CSR data storage mechanism.

* * * * *